(12) United States Patent
Ohno et al.

(10) Patent No.: US 7,625,529 B2
(45) Date of Patent: Dec. 1, 2009

(54) CATALYST-CARRYING FILTER

(75) Inventors: Kazushige Ohno, Gifu (JP); Noriyuki Taoka, Gifu (JP)

(73) Assignees: Ibiden Co., Ltd., Gifu (JP); Toyota Jidosha Kabushiki Kaisha, Aichi (JP)

( * ) Notice: Subject to any disclaimer, the term of this patent is extended or adjusted under 35 U.S.C. 154(b) by 735 days.

(21) Appl. No.: 10/362,975

(22) PCT Filed: Oct. 1, 2001

(86) PCT No.: PCT/JP01/08649

§ 371 (c)(1), (2), (4) Date: Mar. 6, 2003

(87) PCT Pub. No.: WO02/26351

PCT Pub. Date: Apr. 4, 2002

(65) Prior Publication Data

US 2004/0033175 A1 Feb. 19, 2004

(30) Foreign Application Priority Data

Sep. 29, 2000 (JP) ............................. 2000-299962
Feb. 23, 2001 (JP) ............................... 2001-48401

(51) Int. Cl.
*B01D 50/00* (2006.01)

(52) U.S. Cl. ..................................................... 422/180

(58) Field of Classification Search ................. 422/168, 422/222, 177, 180, 211, 220; 423/239.1
See application file for complete search history.

(56) References Cited

U.S. PATENT DOCUMENTS

| 3,410,651 | A |   | 11/1968 | Brandenburg et al. ..... 423/213.2 |
|---|---|---|---|---|
| 3,554,929 | A |   | 1/1971  | Aarons ........................ 502/178 |
| 3,656,830 | A |   | 4/1972  | Kurschner ................... 359/514 |
| 3,767,453 | A |   | 10/1973 | Hoekstra ..................... 427/243 |
| 4,102,819 | A |   | 7/1978  | Petrow et al. ............... 502/262 |
| 4,273,188 | A | * | 6/1981  | Vogel et al. ................. 166/256 |
| 4,399,185 | A |   | 8/1983  | Petrow ........................ 442/121 |
| 4,419,108 | A |   | 12/1983 | Frost et al. .................... 95/286 |
| 4,438,219 | A |   | 3/1984  | Brandenburg et al. ........ 502/333 |
| 4,483,940 | A |   | 11/1984 | Ono et al. ................... 502/159 |
| 4,528,279 | A |   | 7/1985  | Suzuki et al. ............... 502/200 |
| 4,572,904 | A |   | 2/1986  | Onal ........................... 502/333 |

(Continued)

FOREIGN PATENT DOCUMENTS

BE 1000795 4/1989

(Continued)

OTHER PUBLICATIONS

English Language Abstract of JP 5-23512.

(Continued)

*Primary Examiner*—Tom Duong
(74) *Attorney, Agent, or Firm*—Greenblum & Bernstein, P.L.C.

(57) ABSTRACT

A catalyst holding filter reducing a pressure loss. A catalyst holding filter (10) is made of a ceramic support (4) of SiC covered with a catalyst layer (2). An average pore size of the ceramic support is 10-250 μm, and a porosity of the ceramic support is 40-80%. The catalyst layer contains a catalyst, a cocatalyst and a support material.

19 Claims, 17 Drawing Sheets

U.S. PATENT DOCUMENTS

| | | | | |
|---|---|---|---|---|
| 4,702,897 | A | | 10/1987 | Onal .................. 423/213.5 |
| 4,749,671 | A | | 6/1988 | Saito et al. .................. 502/64 |
| 4,849,275 | A | * | 7/1989 | Hamaguchi et al. ......... 428/116 |
| 4,919,902 | A | | 4/1990 | Bricker et al. ............. 423/213.5 |
| 4,940,684 | A | | 7/1990 | Okutani et al. .............. 502/178 |
| 4,959,338 | A | | 9/1990 | Miura et al. ................. 502/263 |
| 5,139,760 | A | | 8/1992 | Ogawa et al. ............. 423/328.1 |
| 5,171,341 | A | | 12/1992 | Merry ......................... 55/484 |
| 5,180,567 | A | * | 1/1993 | Yoshimoto et al. ....... 423/239.1 |
| 5,185,110 | A | * | 2/1993 | Hamaguchi et al. ........... 264/44 |
| 5,316,738 | A | * | 5/1994 | Kojima et al. ............... 422/180 |
| 5,346,722 | A | | 9/1994 | Beauseigneur et al. ...... 427/300 |
| 5,453,260 | A | | 9/1995 | Nakazawa et al. ........ 423/327.1 |
| 5,776,419 | A | | 7/1998 | Ihara et al. .................. 422/177 |
| 5,830,415 | A | | 11/1998 | Maeda et al. ................ 422/171 |
| 5,853,444 | A | | 12/1998 | Maier et al. .................... 55/523 |
| 5,914,187 | A | | 6/1999 | Naruse et al. ................ 428/327 |
| 6,017,473 | A | | 1/2000 | Maier et al. ................. 264/29.6 |
| 6,669,751 | B1 | | 12/2003 | Ohno et al. .................... 55/523 |
| 6,939,825 | B1 | | 9/2005 | Ohno et al. .................. 502/439 |
| 7,250,385 | B1 | | 7/2007 | Ohno et al. |
| 2004/0055265 | A1 | | 3/2004 | Ohno et al. .................... 55/523 |
| 2005/0159310 | A1 | | 7/2005 | Ohno et al. .................. 502/439 |
| 2005/0176581 | A1 | | 8/2005 | Ohno et al. .................. 502/439 |

FOREIGN PATENT DOCUMENTS

| | | | |
|---|---|---|---|
| EP | 0625371 | | 11/1994 |
| EP | 658363 | A1 * | 6/1995 |
| EP | 0766993 | | 4/1997 |
| EP | 0816065 | | 1/1998 |
| EP | 0834343 | | 4/1998 |
| EP | 0884457 | | 12/1998 |
| EP | 1142619 | | 10/2001 |
| EP | 1214973 | | 6/2002 |
| JP | 57-010335 | | 1/1982 |
| JP | 57-144039 | | 9/1982 |
| JP | 59-076516 | | 5/1984 |
| JP | 61-007860 | | 3/1986 |
| JP | 63-065927 | | 3/1988 |
| JP | 63-218254 | | 9/1988 |
| JP | 1-297145 | | 11/1989 |
| JP | 02-075314 | | 3/1990 |
| JP | 4-040237 | | 2/1992 |
| JP | 5-23512 | | 2/1993 |
| JP | 5-068892 | | 3/1993 |
| JP | 6-063423 | | 3/1994 |
| JP | 6-024636 | | 4/1994 |
| JP | 6-182214 | | 7/1994 |
| JP | 08-012460 | | 1/1996 |
| JP | 08-028246 | | 1/1996 |
| JP | 9-158710 | | 6/1997 |
| JP | 9-173866 | | 7/1997 |
| JP | 9-220423 | | 8/1997 |
| JP | 9-276708 | | 10/1997 |
| JP | 10-99626 | | 4/1998 |
| JP | 11-81983 | | 3/1999 |
| JP | 2001-187344 | | 7/2001 |
| JP | 2001-199777 | | 7/2001 |
| WO | 00/01463 | | 1/2000 |

OTHER PUBLICATIONS

English Language Abstract of JP 1-297145.
English Language Abstract of JP 9-158710.
English Language Abstract of JP 9-173866.
English Language Abstract of JP 9-220423.
English Language Abstract of JP 9-276708.
English Language Abstract of JP10-99626.
English Language Abstract of JP 2001-199777.
English Language Abstract of JP 2001-187344.
English Language Abstract of JP 4-040237.
English Language Abstract of JP 63-218254.
English Language Abstract of JP 5-068892.
English Language Abstract of JP 62-045344.
English Language Abstract of JP 61-007860.
English Language Abstract of JP 57-144039.
English Language Abstract of JP 57-010335.
English Language Abstract of JP 6-063423.
English Language Abstract of JP 6-182214.
English Language Abstract of BE 1000795.
English language Abstract of JP 11-81983.
English abstract of JP 02-075314, published Mar. 15, 1990.
English abstract of JP 59-076516, published May 01, 1984.
English abstract of JP 08-028246, published Jan. 30, 1996.
English abstract of JP 08-012460, published Jan. 16, 1996.

* cited by examiner $\Delta P = \Delta P1 + \Delta P2 + \Delta P3 + \Delta P4$ (Figure 1)
$\Delta P1$: resistance due to narrowing of opening of path
$\Delta P2$: resistance passing through fine pipe
$\Delta P3$: resistance passing through wall
$\Delta P4$: resistance passing through deposited PM <<100℃30h>>

(no thin film)

Invention embodiment(presence of thin film)

CATALYST-CARRYING FILTER

TECHNICAL FIELD

This invention relates to a catalyst holding filter for purifying an exhaust gas of an engine. More particularly, the invention relates to a catalyst holding filter capable of efficiently conducting oxidation removal of carbon monooxide (CO) and hydrocarbon (HC) and reduction of nitrogen oxide (NOx) included in an exhaust gas.

BACKGROUND ART

Heretofore, as a catalyst holding filter for the purification of an exhaust gas in an automobile, there is, for example, one of purifying an exhaust gas of a diesel engine. As shown in FIG. 17(a) and FIG. 17(b), a catalyst holding filter 100 is used by forming cells 101 as a path of an exhaust gas from a porous silicon carbide sintered body in a honeycomb shape and alternately clogging these cells 101. It is common that the catalyst holding filter 100 is connected to an exhaust side of a diesel engine and particulates (PM: particulate matter) deposited on the filter 100 and HC, CO and the like are decomposed through oxidation. By such an oxidation decomposition is reduced pressure loss due to the presence of the filter, whereby the exhaust gas can be purified without applying a load to the engine and causing the engine stop.

Such a catalyst holding filter 100 is disclosed in JP-A-5-23512. That is, there is reported a filter wherein an average value of a pore size as measured by a mercury pressure process is within a range of 1 μm to 15 μm and a standard deviation of pore size distribution represented by common logarithm of the pore size is not more than 0.20.

By using this filter can be obtained a high catching efficiency. However, when the catalyst amount is increased for raising combustion reactivity of soot, it is confirmed that pressure loss becomes unexpectedly higher when the soot is caught over a long time.

DISCLOSURE OF THE INVENTION

The invention has noticed at problem points existing in such a conventional technique. An object thereof is to provide a catalyst holding filter being small in the pressure loss of the exhaust gas. And also, another object is to provide a catalyst holding filter capable of enhancing a collecting efficiency of particulates included in the exhaust gas.

In order to solve the above subject, the inventors have made various studies and found an unexpected phenomenon that the pressure loss is influenced by the pore size and porosity and even when the pore size and the porosity is made large, if the catalyst is coated, the pressure loss becomes rather larger.

In the invention described in claim 1 or 2, a catalyst holding filter for purification of exhaust gas lies in that a catalyst coat layer comprising a catalyst, a cocatalyst and a support material is formed on particles of a ceramic support having an average pore size of 10-250 μm and a porosity of 40-80% or 40-70%.

Moreover, the formation of the catalyst coat on the particles of the ceramic support means that the ceramic particles are sintered to form a three-dimensional network structure (ceramic support) and when the three-dimensional network structure is cut at two-dimensional section, the catalyst coat is formed around the particles other than joint portion of the particles constituting the ceramic filter.

In the invention of claim 3, the catalyst in the catalyst holding filter described in claim 1 or 2 contains an element selected from noble metal element, element of Group Via of the periodic table and element of Group VIII of the periodic table.

In the invention of claim 4, the cocatalyst in the catalyst holding filter described in claims 1-3 is at least one element selected from cerium, lanthanum, barium and calcium or a compound thereof.

In the invention of claim 5, the support material in the catalyst holding filter described in any one of claims 1-4 contains at least one selected from alumina, zirconia, titania and silica.

In the invention of claim 6, the ceramic support in the catalyst holding filter described in any one of claims 1-5 is silicon carbide, silicon nitride, cordierite, mullite, sialon, silica or zirconium phosphate.

In the invention of claim 7, the ceramic support in the catalyst holding filter described in any one of claims 1-6 has a honeycomb structure having plural through-holes defined by cell walls.

In the invention of claim 8, the ceramic support in the catalyst holding filter described in claim 7 has a checkered pattern formed by alternately sealing both end portions with sealing bodies.

In the invention of claim 9, the average pore size in the catalyst holding filer described in any one of claims 1-8 is measured by a mercury pressure process and a standard deviation (SD1) of pore size distribution when the pore size is represented by a common logarithm is not more than 0.40.

In the invention of claim 10, the average pore size in the catalyst holding filer described in any one of claims 1-9 is measured by a mercury pressure process and a standard deviation (SD1) of pore size distribution when the pore size is represented by a common logarithm is not more than 0.20.

The function of the invention will be described below.

According to the invention described in claims 1 and 2, the catalyst coat layer is formed on the surfaces of the particles constituting the ceramic support. When the average pore size is less than 10 μm, the pressure loss considerably increases because the pore size is decreased by the catalyst coat layer. And also, as the average pore size becomes larger, the increase of the pressure loss by the catalyst coat layer is suppressed. However, when soot is caught, if the pore size exceeds 250 μm, the pore size becomes too large, and the soot deposited on the surface of the ceramic support inserts into the inside of the ceramic wall through such large pores to clog a gas passing portion thereof, so that it is considered that the pressure loss inversely increases irrespectively of a larger pore size. On the other hand, when the porosity is less than 40%, the gas passing portion is clogged with the catalyst coat layer and hence the pressure loss becomes larger. While, when it exceeds 70%, the catalyst coat layer is apt to be thickly adhered, but is easily peeled off and hence the peeled catalyst coat layer is deposited in the pores to increase the pressure loss. If it further exceeds 80%, the pressure loss more increases and there in no practical use.

Moreover, when the catalyst is applied to the inner wall face of the ceramic support as described in JP-A-5-23512 (FIG. 18), if the soot is caught over a long time, the deposited layer of the soot is formed on the surface and hence the pressure loss becomes larger.

According to the invention, however, the pressure loss is not become large even if the soot is caught over a long time, so that the filter according to the invention can be used over a long time and is excellent in the practical use.

According to the invention of claim 3, the deterioration through poison (lead poison, phosphorus poison, sulfur poison) can be decreased and also the thermal degradation can be made small, so that the durability of the catalyst holding filter can be improved.

According to the invention of claim 4, the cocatalyst selected from at least one element of cerium, lanthanum, barium and calcium or a compound thereof is used, so that the durability of the catalyst can be improved.

According to the invention of claim 5, the support material is made of at least one selected from alumina, zirconia, titania and silica. Therefore, it is possible to promote separating-off of sulfur component obstructing the activity of the catalyst from the ceramic support. Particularly, when the catalyst holding filter is used for purifying the exhaust gas from the diesel engine, a great amount of sulfur component is included in a fuel, so that it is effective to use the above oxides in the ceramic support.

According to the invention of claim 6, the ceramic support is either of silicon carbide, silicon nitride, cordierite, mullite, sialon, silica and zirconium phosphate, so that the catalyst holding filter having excellent heat resistance and thermal conductivity can be provided.

According to the invention of claim 7, the ceramic support has a honeycomb structure, so that a contact area capable of contacting the exhaust gas with the catalyst becomes large. As a result, the purification performance can be improved.

According to the invention of claim 8, both end portions of the ceramic support are alternately sealed with sealing members in a checkered pattern, so that the exhaust gas invaded from one end of the ceramic support always passes through the cell wall to discharge out from the other end thereof. Therefore, the purification performance can be more improved.

According to the inventions of claims 9 and 10, when the standard deviation of pore size distribution exceeds 0.40, or when the pore size is not distributed within a narrow range and the size is scattered, if the catalyst is coated, the slurry holding the catalyst easily collects in a finer portion than a coarse portion through a capillary phenomenon. Therefore, there is more caused the difference in the pore size. As a result, the gas passing path in the filter wall is ununiformized by the catalyst coat layer and soot passes through a portion having a larger size. To this end, the catching efficiency lowers.

Furthermore, the standard deviation of the pore size distribution is desirable to be 0.05-0.40. In this case, the strength when the catalyst is coated onto the ceramic particle is highest (FIG. 19(c)).

When the standard deviation is less than 0.05, the pore size becomes too uniform and hence the crack easily proceeds and the fracture strength lowers. While when the standard deviation exceeds 0.40, the large pores are existent and hence the fracture strength considerably lowers.

Moreover, such a relation between the fracture strength and the pore size distribution is a peculiar problem produced when the catalyst is coated onto the ceramic particles.

Such a problem is not caused when the catalyst is simply coated onto the wall surface of the ceramic support.

However, it is considered that when the catalyst layer is formed on the ceramic particles, if the temperature is raised to about 300° C., since the difference in thermal expansion coefficient between the catalyst coat layer such as catalyst metal, alumina or the like and ceramic being catalyst support is large, the catalyst coat layer is thermally expanded to enlarge the distance between the particles to thereby cause the crack. For this end, when the distribution of the pore size is uniform, the temperature of the filter rises in use and hence the crack grows and the lowering of the strength is caused. And also, when the pore distribution is large, the lowering of the strength becomes conspicuous at a portion having a large pore size and also the strength lowers. Therefore, when the catalyst layer is formed on the ceramic particles, the difference in the strength is caused by the standard deviation of the pore size.

19(c) is a graph showing between standard deviation and average bending strength based on the catalyst coat,

BEST MODE FOR CARRYING OUT THE INVENTION

An embodiment of the invention will be explained in detail with reference to the accompanying drawings below.

Figure 1:
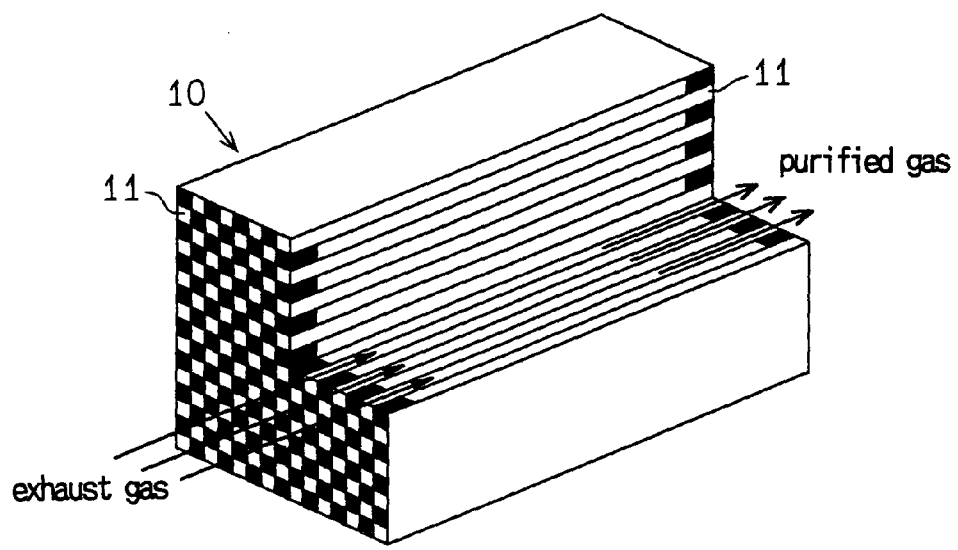
FIGS. 1(a) and 1(b) are schematic views of an embodiment of the catalyst support according to the invention.
Figure 1:
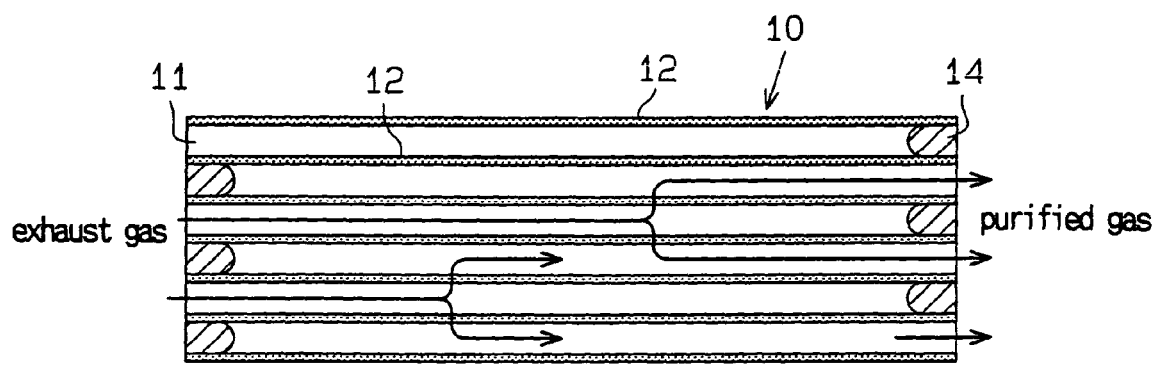
Figure 2:
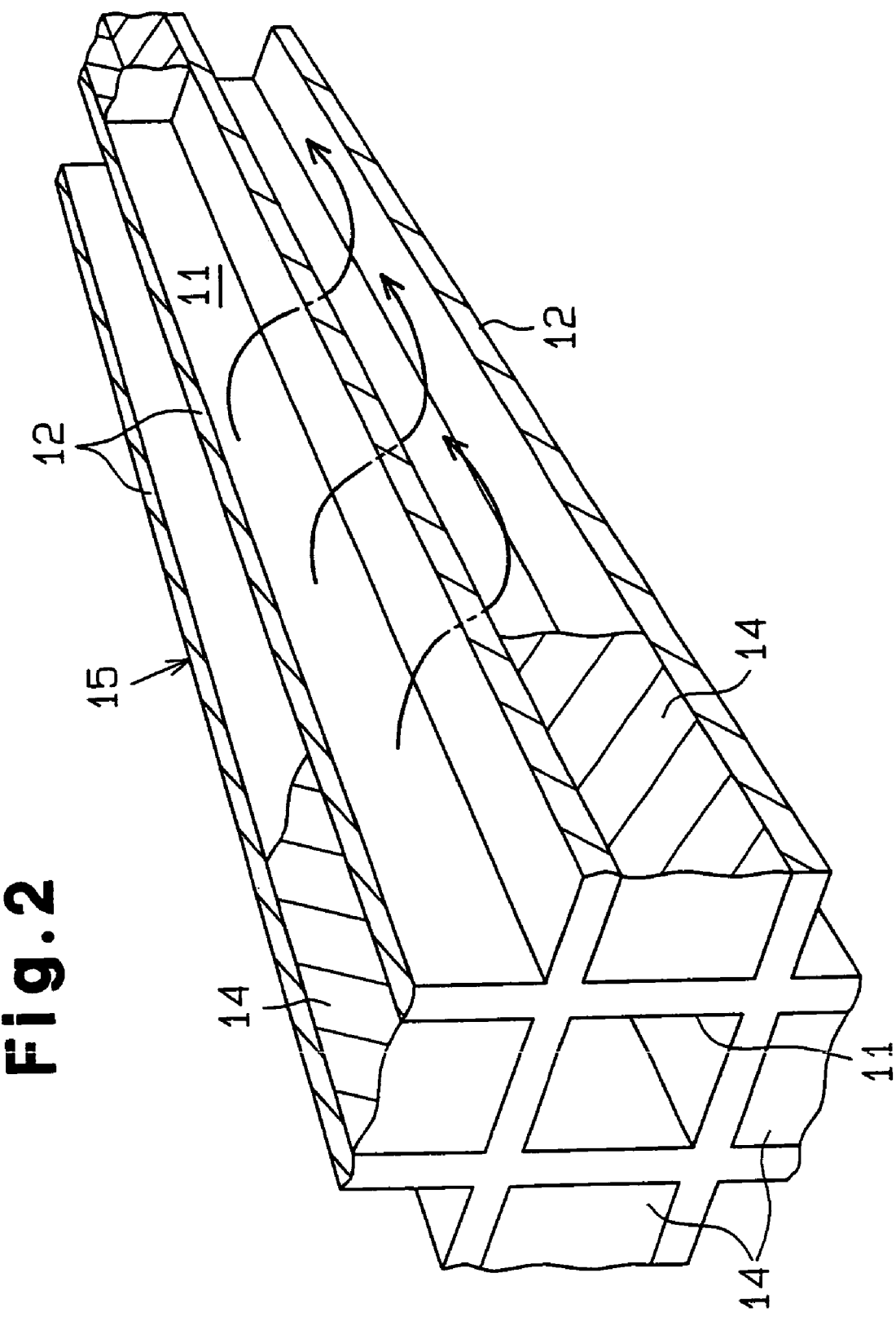
FIG. 2 is an enlarged perspective view of a part of the catalyst support.

As shown in FIGS. 1-3, a catalyst holding filter 10 according to an embodiment of the invention comprises a silicon-containing ceramic, for example, a ceramic support 15 made of a porous silicon-containing ceramic sintered body silicon-containing ceramic being silicon carbide as a preferable embodiment. In the ceramic support 15 are cell walls 12. Surfaces of sintered SiC particles 4 constituting the cell wall 12 are individually covered with a catalyst coat layer 2 at a given thickness.

The catalyst coat layer 2 comprises a catalyst and a cocatalyst held on a support member. In this embodiment, the support member is a thin film 3 made of alumina ($Al_2O_3$) (hereinafter referred to as alumina thin film). In addition to alumina, it may be optionally changed unless at least one selected from zirconia (zirconium dioxide: $ZrO_2$), titania (titanium oxide: $TiO_2$) and silica (silicon oxide: $SiO_2$) is included.

Concretely, there is $ZrO_2$, $TiO_2$ or $SiO_2$ as one kind of the oxides. As two kinds of the oxides is $Al_2O_3/ZrO_2$, $Al_2O_3/TiO_2$, $Al_2O_3/SiO_2$, $ZrO_2/TiO_2$ or $ZrO_2/SiO_2$. As three kinds of the oxides is $Al_2O_3/ZrO_2/TiO_2$, $Al_2O_3/ZrO_2/SiO_2$, $Al_2O_3/TiO_2/SiO_2$ or $ZrO_2/TiO_2/SiO_2$. As four kinds of the oxides is $Al_2O_3/ZrO_2/TiO_2/SiO_2$.

As the silicon-containing ceramic support 15, there may be used ones obtained by milling ceramic powder belonging to an oxide ceramic such as silicon carbide powder, silicon nitride powder or an oxide ceramic such as sialon, mullite, cordierite or the like with an organic binder, a lubricant, a plasticizer and water and extrusion-shaping and sintering. Thus, there is formed a wall flow honeycomb type-filter as shown in FIG. 1(a), FIG. 1(b) and FIG. 2.

The invention is described with reference an example of using SiC sintered body as the silicon-containing ceramic support 15.

The ceramic support 15 is constructed with SiC sintered body wherein cells 11 as plural through-holes are regularly formed in its axial line direction in approximately square form at section. These cells 11 are separated from each other through cell walls 12. Opening portions of each cell 11 are sealed at one end face side with a sealing member 14 and opened at the other end face side of the cell 11. Therefore, the opening portions and the sealed portions as a whole are alternately arranged at each end face side so as to indicate so-called checkered pattern. In the ceramic support 15 made from the SiC sintered body are formed many-cells 11 each having a square form at section. In other words, the ceramic support 15 has a honeycomb structure.

Moreover, a density of the cell 11 is 200-350 cells/square inch. That is, about a half of many cells 11 are opened at upstream side end faces and the remaining cells are opened at downstream side end faces. A thickness of the cell wall 12 partitioning the cells 11 is set to be about 0.4 mm.

Figure 3A:
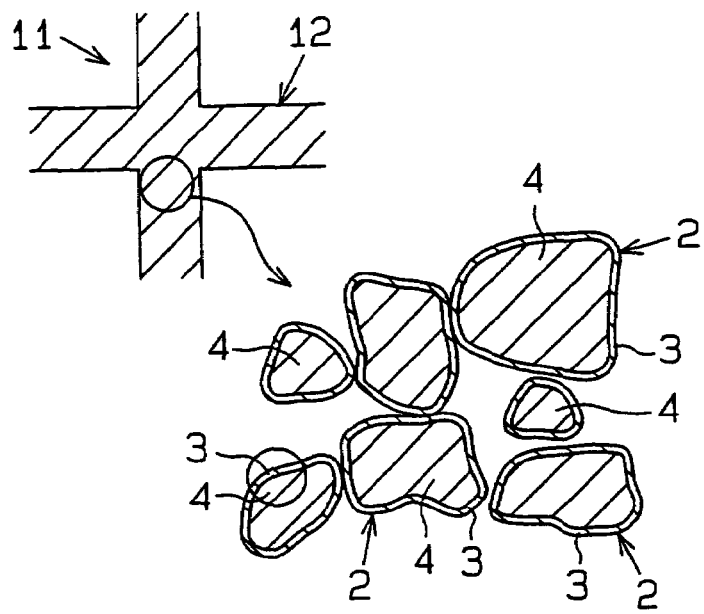
FIGS. 3(a) and 3(b) are conceptual views of an embodiment of the alumina thin film.

The ceramic support 15 made of the SiC sintered body has a structure of partitioning with porous cell walls 12 as shown in FIG. 3(a). As shown by a curve C1 in a graph of FIG. 16, the ceramic support 15 is necessary to have an average pore size m1 of 10-250 µm as measured by a mercury pressure process. The average pore size m1 is preferably within a range of 10-150 µm or 10-100 µm.

Figure 6A:
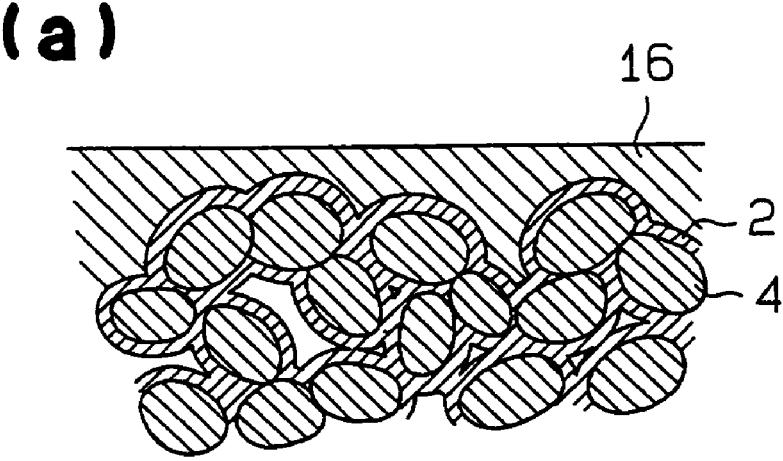
FIG. 6(a) is a diagrammatic view showing a state that soot is caught on a surface layer in case of smaller pore size.
Figure 6B:
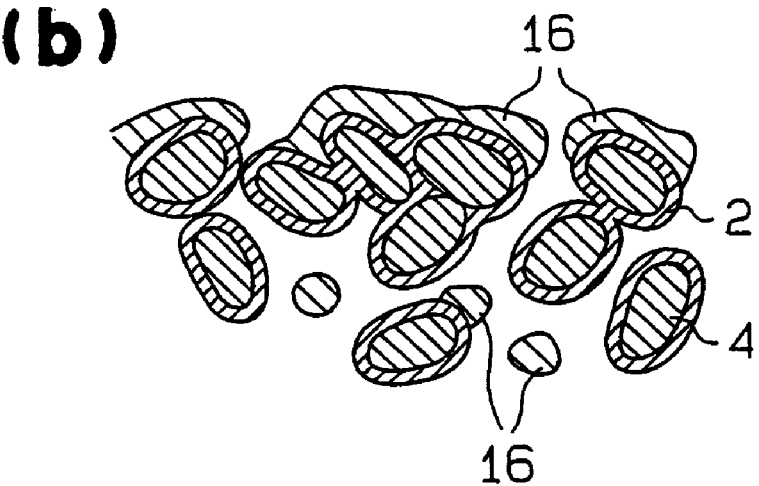
FIG. 6(b) is a diagrammatic view showing a state that soot is caught in a deep layer in case of adequate pore size.
Figure 6C:
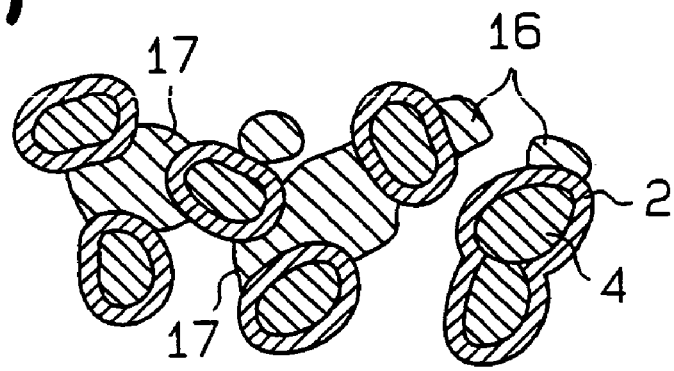
FIG. 6(c) is a diagrammatic view showing a state that the pore size is large and hence soot is bridged between the inner faces.

When the cell wall 12 has such a pore size, it is preferable to catch fine particulates. That is, when the average pore size m1 of the cell wall 12 is set to the above range, diesel particulates included in the exhaust gas can be caught at a low pressure loss. When the average pore size is less than 10 µm, as shown in FIG. 6(a), the pore size is made smaller by the catalyst coat layer 2 and hence the pressure loss is considerably increased to cause the stop of the engine. And also, as the average pore size becomes large, the increase of the pressure loss due to the catalyst coat layer 2 is suppressed. However, as shown in FIG. 6(b), when soot 16 is caught, soot 16 deposits even in pores inside the wall when the pore size exceeds 50 µm (deep layer filtration). Furthermore, as shown in FIG. 6(c), when the pore size exceeds 250 m, the soot aggregates and soot 17 bridged between the pores of the wall are pointedly existent in the wall. The soot 16 is secondary particulate aggregate of carbon fine particles degrading permeation of gas and hence the pressure loss becomes very high when passing through the soot layer. Therefore, it is possible to control the increase of the pressure loss when the average pore size is set to be the above range.

Figure 6D:
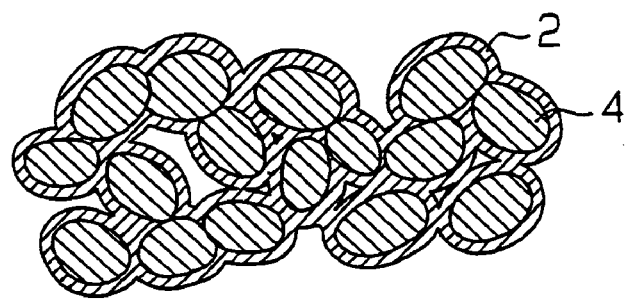
FIG. 6(d) is a diagrammatic view showing a state that the catalyst coat layer is existent on a surface layer in case of a low porosity.
Figure 6E:
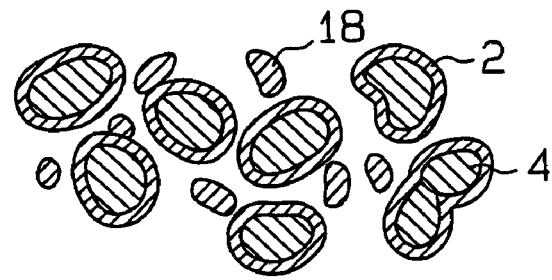
FIG. 6(e) is a diagrammatic view showing a state that the catalyst coat layer is peeled off to laminate on pores in case of a high porosity.

As shown in FIG. 6(d), when the porosity is less than 40%, the support is densified by the catalyst coat layer 2 required at minimum to increase the pressure loss. On the other hand, as shown in FIG. 6(e), as the porosity becomes high, the region occupied by the catalyst coat layer 2 increases, but the surface area of the particles is less and the thickness of the catalyst coat layer 2 becomes thick and resistance to peeling lowers. As a result, when the porosity exceeds 70%, the adhesion strength durable to the resistance to gas passing near to the catalyst is not maintained and the catalyst coat layer 2 is peeled off and the peeled catalyst 18 deposited in the pores to increase the pressure loss. When the porosity exceeds 80%, this tendency is further large and the pore is partially clogged with the peeled catalyst 18 to bring about the considerable pressure loss.

Figure 16:
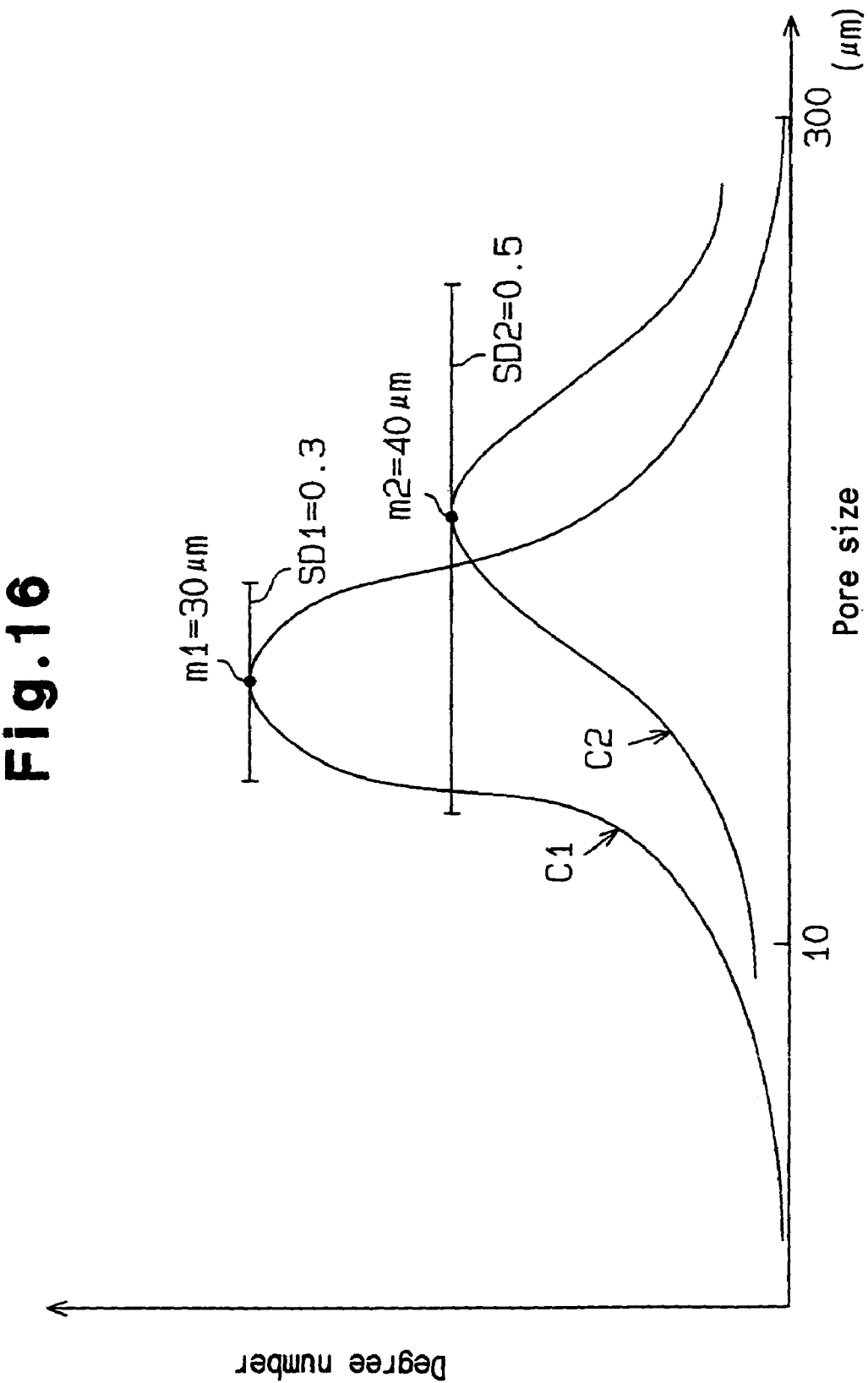
FIG. 16 is a graph showing states of pore size distribution of a filter in Example and Comparative Example.

As shown in the graph of FIG. 16, a standard deviation D1 of pore size distribution when the pore size is represented by a common logarithm is required to be not more than 0.40. Moreover, the standard deviation D1 is preferably not more than 0.30, particularly not more than 0.20. Moreover, the degree number in FIG. 16 is shown by log differential pore volume V1d(n). That is, $V1d(1)=0$, $V1d(n)=\{V(n)-V(n-1)\}/\{\log[D(n-1)]-\log[D(n)]\}$
(n≧2)

wherein D(n) is a diameter of a fine pore and V(n) is an estimated pore volume.

Figure 6F:
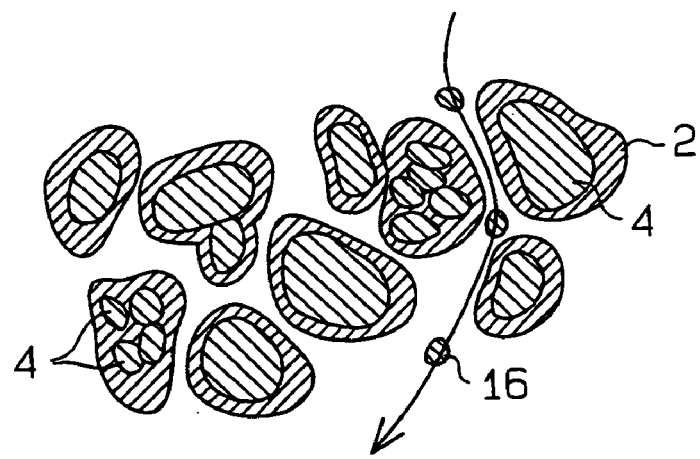
FIG. 6(f) is a diagrammatic view showing a state that the pore size is scattered and the catalyst is aggregated.
Figure 6G:
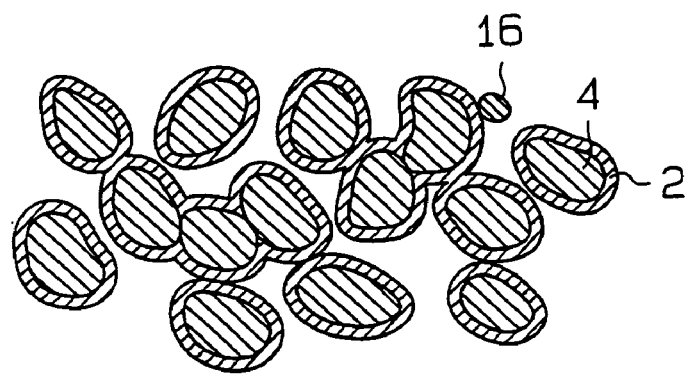
FIG. 6(g) is a diagrammatic view showing a state that the catalyst is uniformly dispersed without scattering the pore size.

When the standard deviation of the pore size distribution is not less than 0.40, or when the pore size is scattered without distributing in the limited narrow range, if the catalyst is coated, as shown in FIG. 6(f), the slurry holding the catalyst is easily collected in a finer portion of the pores rather than a coarse portion thereof through a capillary phenomenon. As a result, there is more caused a difference in pores. Therefore, the path of flowing the gas in the filter wall is ununiformized by the catalyst coat layer and hence the soot 16 easily passes through pores having a large size. Consequently, the catching efficiency is degraded. That is, as shown in FIG. 6(g), when the number of pores satisfying a catching preferable range of the standard deviation of not more than 0.40 is relatively large, the catching efficiency is improved. And also, when the standard deviation is set to be not more than 0.20, the catching efficiency is more improved and the reaction of the catalyst becomes better.

Furthermore, the standard deviation of the pore size distribution is desirable to be 0.05-0.40. Because the strength when the catalyst is coated on the ceramic particles is highest (FIG. 19(c)).

When the standard deviation is less than 0.05, the pore size is too uniform and the crack easily progresses due to temperature rising and the fracture strength lowers. On the other hand, when the standard deviation is more than 0.40, large pores can be obtained and the fracture strength considerably lowers. That is, when the catalyst layer is formed on the ceramic particles, if the temperature is raised to 300° C., it is considered that the catalyst coat layer of catalyst metal, alumina and the like expands to enlarge a space between the particles to thereby cause crack because there is a difference in thermal expansion coefficient to the catalyst support. Therefore, when the distribution of the pore size is uniform, the temperature of the filter in use rises and hence the crack progress and the strength lowers. And also, when the pore distribution is large, the lowering of the strength becomes remarkable in the portion having a large pore size and the strength lowers. Therefore, when the catalyst layer is formed on the ceramic particles, the difference in the strength is caused.

As mentioned above, the average pore size of the ceramic support 15 is set to 10-250 μm and porosity of the ceramic support 15 is set to 40-80%, so that the pressure loss can be lowered but also the mechanical strength can be improved. In addition, the catching efficiency of particulate included in the exhaust gas can be enhanced.

In case of producing such a ceramic support 15, there are compounded and used, for example, silicon carbide powder having an average particle size of about 10-300 μm, silicon carbide powder having an average particle size of about 0.1-5 μm, and if necessary, silicon carbide powder having a middle average particle size as a starting material, and about 6-50 parts by weight of methylcellulose as a binder based on 100 parts by weight of ceramic powder, about 0-50 parts by weight of a pore forming agent made of a substance dissipating by heat at a stage before arriving to a sintering temperature of the ceramic for forming given porosity and pore size based on 100 parts by weight of the ceramic powder and 10-50 parts by weight of a dispersion of an organic solvent and water based on 100 parts by weight of the ceramic powder.

Then, such compounded starting materials are mixed and milled and shaped into a honeycomb through an extrusion shaping, and a part of the resulting cells are sealed in a checkered pattern. Next, the shaped body is dried at 100-200° C., degreased at 300-500° C. and fired in an inert atmosphere at 1800-2400° C. for 4-30 hours to obtain a desired ceramic support 15.

The ceramic support 15 having relatively large average pore size and porosity according to the embodiment of the invention can be prepared, for example, by the following method.

That is, the pore forming agent made of the substance dissipating by heat at a stage before arriving to the sintering temperature of the ceramic is previously added to the shaped body made of the ceramic starting materials and the firing is carried out at such a state. As a result, there can be obtained a porous sintered body having large pores in its matrix.

When the firing is carried out at a state of adding the pore forming agent, the pore forming agent is dissipated by heat at a stage before arriving at the sintering temperature of the ceramic and a large pore is formed in a place corresponding to the presence of the pore forming agent. Therefore, the large pore having desired size and shape can be formed relatively simply and surely. Moreover, the pore forming agent is dissipated and hardly remains in the texture of the ceramic support 15. Therefore, this method has a merit that the degradation of the properties in the sintered body due to the incorporation of impurities can previously be prevented.

It is favorable that the pore forming agent is added at a stage of preparing the ceramic starting material and uniformly milled with the other materials. The pore forming agent is favorable to be concretely a substance dissipating by heat at a stage before arriving at the sintering temperature of silicon carbide (about 2200° C.). The term "dissipating by heat" means that the substance is substantially lost from the sintered body by sublimation, evaporation, decomposition, reaction sintering or the like through heat. The dissipating temperature is desirable to be low, and is concretely not higher than 1000° C. and particularly preferable to be not higher than 500° C. As the dissipating temperature becomes lower, a probability of retaining the impurity in the ceramic support 15 is less and contributes to the improvement of silicon carbide ratio. However, the pore forming agent is desirable not to accompany foaming in the dissipation. Because, in case of the pore forming agent accompanying the foaming, it is difficult to form large pores having uniform size and shape, which has a fear of influencing upon the quality of the ceramic support 15.

As a preferable example of the pore forming agent, there are particles of synthetic resin and the like. In addition to this example, particles made of an organic polymer such as starch and the like may be used. In this embodiment, a spherically granular pore forming agent made of the synthetic resin is used.

The merit of using the particles of the synthetic resin as the pore forming agent lies in a point that it is surely dissipated by heat at a relatively premature stage before arriving at the sintering temperature of silicon carbide. And also, the synthetic resin is comprised of a relatively simple molecule structure and is small in the possibility of producing a complicated compound by heating and hence impurities resulting in the degradation of the properties of the sintered body hardly remain in the ceramic support 15. Furthermore, the synthetic resin is a relatively cheap material, and it does not bring about the increase of the production cost of the ceramic support 15.

Moreover, the shape of the pore forming agent is not limited to the sphere but may be, for example, an elongated sphere, a cube, an indefinite lump, a column, a plate or the like. The average particle size of the pore forming agent may be set to the objective pore size, for example, about 5 μm-250 μm. And also, as to the adjustment of the porosity, the pore forming agent dissipating by firing is added to the starting material at an amount required from a calculation of dissipation volume for a desired porosity.

As a method of holding the catalyst, it is not particularly limited to the following method, but it is effective to cover the surface of the cell wall 12 substantially constituting the ceramic support 15, particularly the surface of each sintered SiC particle 4 constituting the cell wall 12 with the rare earth oxide-containing alumina thin film 3. More accurately, the surfaces of the SiC particles 4 in the SiC sintered body constituting the cell wall 12 are individually covered with the rare earth oxide-containing alumina thin film 3 by various methods.

Figure 3B:
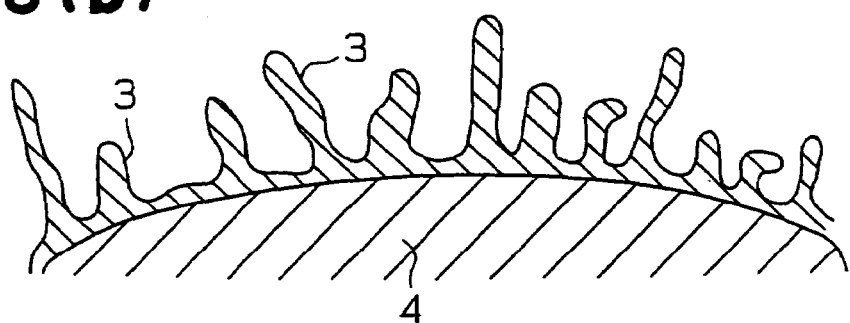
Figure 17A:
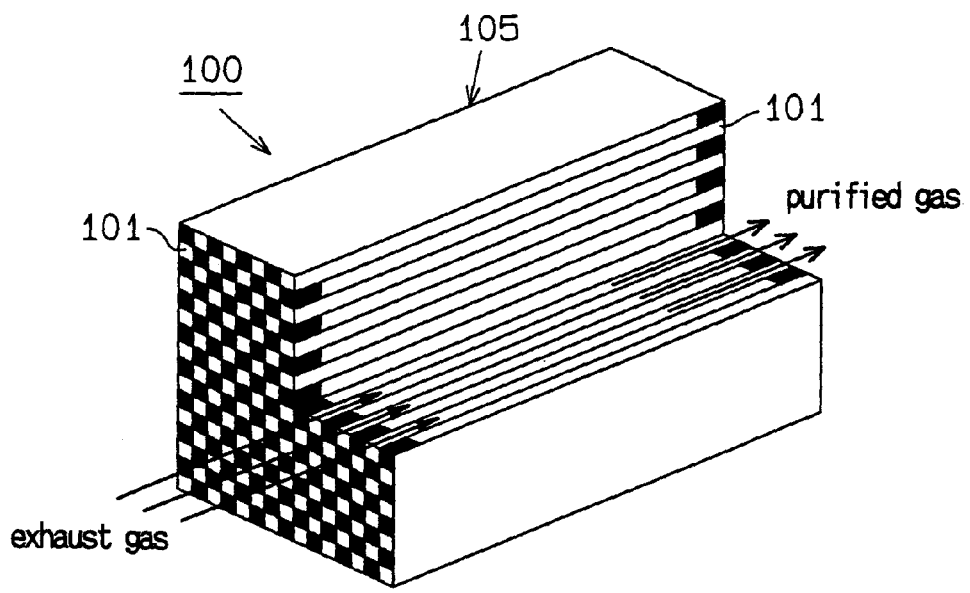
FIGS. 17(a) and 17(b) are schematic views of a catalyst support in the conventional technique.
Figure 17B:
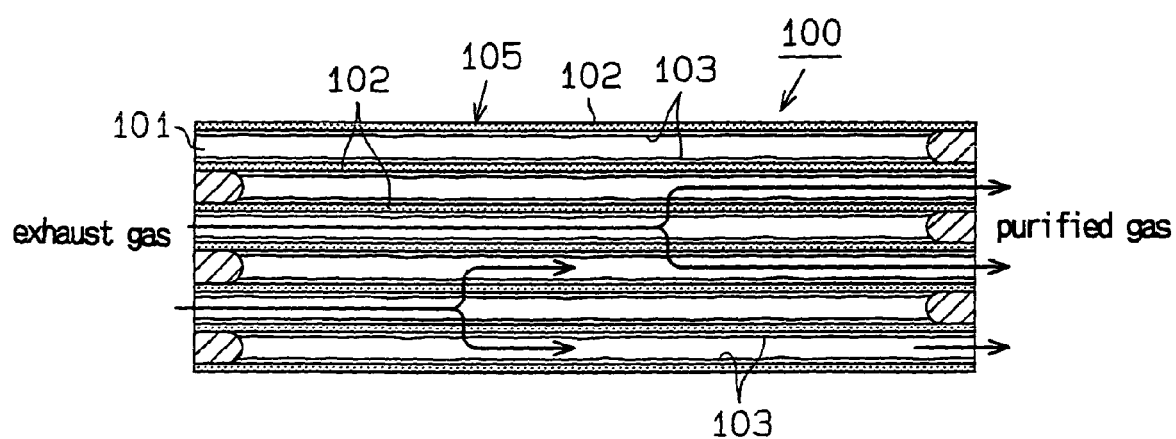
Figures 18A, 18B:
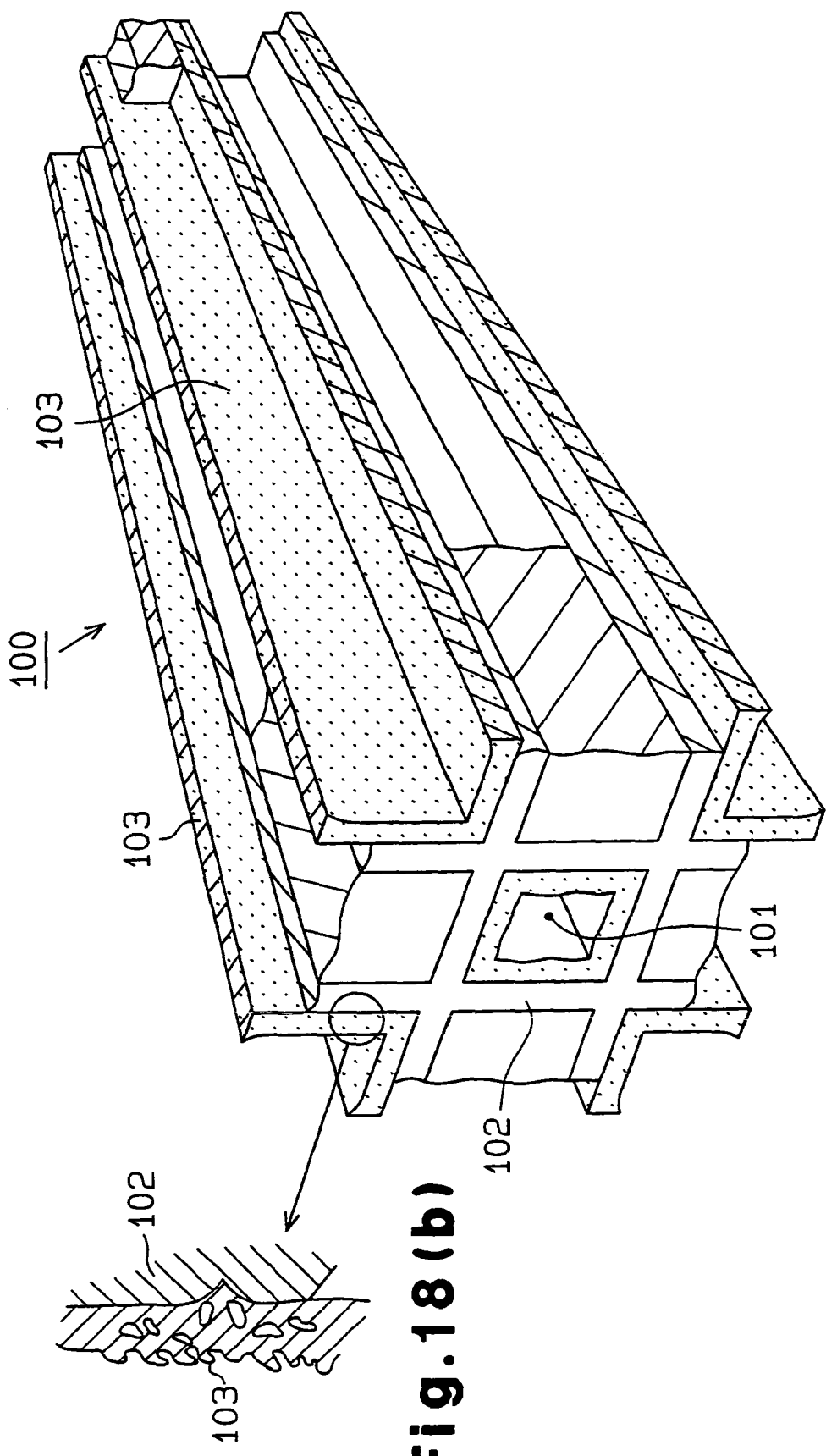
FIGS. 18(a) and 18(b) are conceptual views of a wash-coat alumina layer.

Moreover, FIG. 17(b) shows such a conventional technique that the catalyst coat layer 2 is uniformly covered and formed onto the surface of the cell wall 12 by a wash-coat method, while FIG. 3(a) and FIG. 3(b) are diagrammatic views of embodiments of the ceramic support 15 according to the invention. The latter shows a state that the surfaces of the SiC particles constituting the cell wall 12 are individually covered with the rare earth oxide-containing alumina thin film 3 (hereinafter abbreviated as alumina thin film 3).

Thus, the above characteristic structure in the catalyst holding filter 10 according to the invention is different from the conventional technique wherein the wall face of the cell wall 12 for the exhaust gas is simply and uniformly covered with the catalyst coat layer 2. For example, when the cell wall 12 is uniformly covered as in the conventional technique, gaps between SiC particles 4 is clogged and sealed to obstruct permeation. On the contrary, the ceramic support 15 used in the embodiment of the invention has a structure that each surface of the SiC particles constituting the cell wall 12 is individually covered with the alumina thin film 3.

Therefore, in the embodiment of the invention, the pores of the cell wall 12 itself, i.e. spaces produced between the SiC particles 4 are not completely clogged and the pores are maintained as they are. As a result, the pressure loss can considerably be made small as compared with the conventional catalyst coat layer 2. And also, the alumina thin film 3 individually covers each SiC particle 4 itself, so that there is no peeling of the thin film from the cell wall 12 in the washing with water. As a result, the washing resistance can be improved. Furthermore, the contacting area between the exhaust gas and the catalyst is made large. As a result, oxidation of CO, HC in the exhaust gas can be promoted.

Now, the pressure loss property, heat resistance, washing resistance and regeneration property of the alumina thin film 3 are described below.

(Pressure Loss Property of Alumina Thin Film 3)

Figure 4:
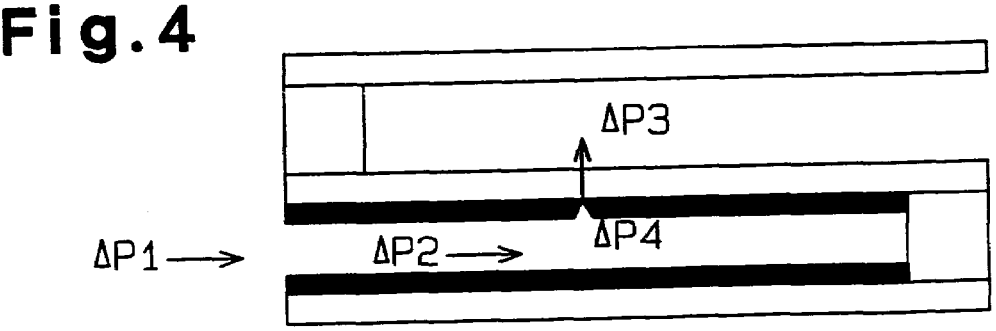
FIG. 4 is a diagrammatic view of a pressure loss property.

In general, the pressure loss property when the exhaust gas passes through the cell wall 12 is considered as follows. That is, the pressure loss when the diesel exhaust gas passes through the ceramic support 15 can be shown in FIG. 4. In this case, resistances $\Delta P1$, $\Delta P2$, $\Delta P3$ are dependent upon the cell structure of the filter, respectively, and are a constant value $\Delta pi = (\Delta P1 + \Delta P2 + \Delta P3)$ irrespectively of the lapse of time such a deposition of diesel particulates and the like, which is called as an initial pressure loss. On the other hand, $\Delta P4$ is a resistance when passing through deposited diesel particulates and is a value higher than 2-3 times the initial pressure loss.

Since a specific surface area of the ceramic support 15 having a cell structure of 14/200 is 8.931 $cm^2/cm^3$ and a density of the ceramic support 15 is 0.675 $g/cm^3$, a specific surface area of the cell wall 12 is 0.0013 $m^2/g$. On the other hand, a specific surface area of a pore in the cell wall 12 is 0.12 $m^2/g$ as measured by a mercury pressure process, and the pore has a surface area of about 50-100 times. This means that when the alumina thin film 3 is formed on the surface of the cell wall 3 at the same weight, if each surface of the SiC particles 4 constituting the cell wall 12 is individually covered as compared with the case of simply and uniformly covering the surface of the cell wall 12, the thickness of the alumina thin film 3 can be made to $1/50$-$1/100$ for obtaining the same effect.

That is, when the alumina thin film 3 is uniformly formed under the conventional technique such as wash coat, in order to coat alumina of about 3 mass % required for the activation of the catalyst, the thickness of the alumina thin film 3 is required to be 50 μm. In this case, as the pressure loss, the resistance passing through the alumina thin film 3 increases in addition to the resistance $\Delta P3$ passing through the cell wall 2. Furthermore, the opening is small and $\Delta P1$ becomes large. For this end, the pressure loss is considerably large as compared with the filter not coated with the alumina, and this tendency becomes more remarkable when the particulate is deposited on the filter.

In this point, when the alumina is coated onto the surfaces of the SiC particles 4 constituting the cell wall 12 as in the ceramic support 15 used in the invention, in order to form the alumina thin film of about 3 mass % required for the activation of the catalyst, the thickness is about 0.5 μm at maximum. In this case, as the increase of the pressure loss, the resistance $\Delta P3$ slightly increases, but the other pressure losses are substantially ignored and hence the pressure loss property is considerably improved as compared with the alumina layer formed by the conventional wash coat method.

(Heat Resistance of Alumina Thin Film 3)

In general, alumina has a higher specific surface area and is suitable as a film holding the catalyst. Particularly, it is desired to develop the catalyst holding filter 10 stably operating at a higher temperature and having a high heat resistance at the present time, so that the alumina thin film 3 is also required to have a more higher heat resistance.

In this point, according to the embodiment of the invention, (1) the shape of each alumina particle is rendered into a fine fiber, and (2) a rare earth oxide such as ceria (cerium oxide) or the like is included in order to improve the heat resistance of the alumina.

Particularly, contact points between alumina particles can be decreased by adopting the construction of the former (1), and the grain growth is controlled through the lowering of the sintering rate and hence the specific surface area can be increased to improve the heat resistance.

That is, the alumina thin film 3 covering the each surface of the SiC particles 4 in the ceramic support 15 according to the invention, the micro-sectional shape of each alumina particle indicates a haired structure of foresting small fibers. Therefore, mutually contact points between adjoining alumina small fibers are decreased to considerably improve the heat resistance.

As to the latter (2), the heat resistance is improved by adding ceria or the like. Because, a new compound is formed on the surface of the crystal grains constituting the alumina thin film 3 to provide an effect of preventing the growth of the alumina grains.

Moreover, in the embodiment of the invention, Si is supplied from SiC or $SiO_2$ existing on slight surface layer thereof in the heat treatment and serves as an action of shielding the mass transfer path to improve the heat resistance. According to the inventors' studies, it has been confirmed that when SiC is intentionally treated at a high temperature to form an oxide film, the heat resistance is further improved.

(Wash Resistance of Alumina Thin Film 3)

The particulate deposited on the surface of the cell wall 12 is mainly composed of carbon, which can be removed by oxidation through a method such as combustion or the like. However, a substance leaving as an ash is existent after the combustion. Such a substance is an oxide or a sulfate of a compound of Ca, Mg, Zn or the like added in an engine oil for serving as a neutralizing agent, a lubricant or the like. And also, a catalyst previously included in a fuel for combusting carbon such as $CeO_2$, CuO or the like is deposited together with the particulate. These ashes deposit in the running of the vehicle over a long time and increase the pressure loss of the filter, so that they are required to be washed with a high pressure water or the like. In this case, the ash can completely be removed by washing under a pressure of not less than 30 $kg/cm^2$.

In this connection, in case of the conventional alumina thin film formed on the surface of the cell wall 12 by the wash coat, a thick coat layer is existent on the whole surface of the cell wall 12 through physical adsorption, so that it is frequently peeled off in the above washing. On the contrary, in the holding film (alumina thin film 3) used in the embodiment of the invention, alumina is thinly and individually coated on each surface of the SiC particles 4 constituting the ceramic support 15. And also, Si is supplied from SiC constituting the ceramic support 15 and chemically bonded. As a result, it is at a state of rigidly adhering to each of SiC particles. Therefore, the resistance to washing is high and the durability as a film is strong.

(Regeneration Property of Alumina Thin Film 3)

In the embodiment of the invention, the alumina thin film 3 is added with a rare earth oxide such as ceria ($CeO_2$) or lanthana ($La_2O_3$) in an amount of 10-80 mass %, preferably 20-40 mass % based on $Al_2O_3$, in which these oxides are uniformly dispersed in the surface or inside of the alumina thin film 3.

When ceria or the like is added to the alumina thin film 3 (it is desirable to add together with a catalyst such as Pt or the like), the supply of oxygen into the exhaust gas is activated by the action of ceria adjusting an oxygen concentration to improve a combustion removing efficiency of "soot (diesel particulate)" adhered to the filter. Hence, the regeneration ratio of the catalyst holding filter 10 is considerably improved. And also, the durability of the catalyst holding filter 10 can be improved.

That is, the rare earth oxide such as ceria or the like not only improves the heat resistance of alumina but also adjusts the oxygen concentration on the surface of the catalyst holding filer 10. In general, hydrocarbon and carbon monooxide included in the exhaust gas are removed by oxidation reaction and NOx is removed by reduction reaction, but the composition of the exhaust gas always changes between rich zone and lean zone in the fuel and hence an atmosphere acting on the surface of the catalyst holding filter 10 violently changes. Ceria added to the catalyst is relatively low in the oxidation-reduction potential between $Ce^{3+}$ and $Ce^{4+}$ and reversibly promotes the following reaction.

$$2CeO_2 \leftrightarrow Ce_2O_3 + \frac{1}{2}O_2$$

That is, as the exhaust gas becomes rich zone, the above reaction progresses in a right direction to supply oxygen to the atmosphere, while as the exhaust gas becomes lean zone, the reaction progresses in a left direction to occlude extra oxygen in the atmosphere. In this way, the oxygen concentration in the atmosphere is adjusted, so that the ceria acts to widen a breadth of air-fuel ratio capable of efficiently removing hydrocarbon, carbon monooxide or NOx.

Figure 12A:
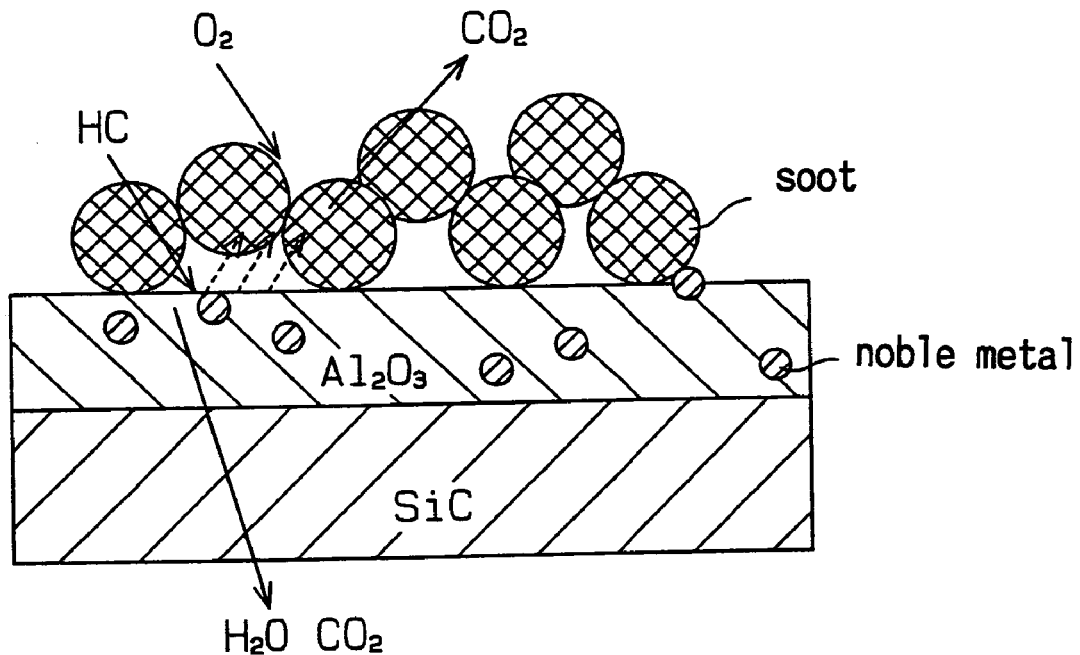
FIGS. 12(a) and 12(b) are diagrammatic views showing a mechanism of improving oxidation rate by addition of $CeO_2$.
Figure 12B:
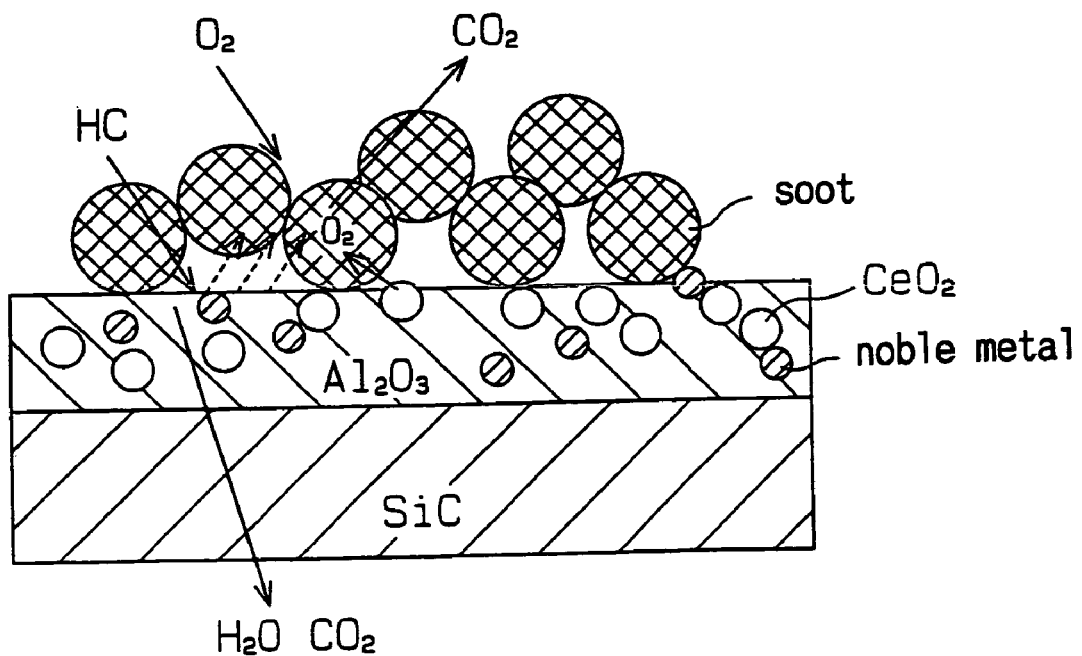

FIG. 12(a) explains a mechanism of oxidation rate of the alumina thin film 3 not added with ceria ($CeO_2$). On the contrary, FIG. 12(b) explains a mechanism of oxidation rate of the alumina thin film 3 added with ceria. As shown in these figures, the catalyst having no ceria activates oxygen in the exhaust gas to oxidize soot. This reaction is poor in the efficiency because oxygen in the fluid should be activated.

On the other hand, in the catalyst having $CeO_2$, oxygen is supplied by the following reaction.

$$CeO_2 \leftrightarrow CeO_{2-x} + x/2 O_2$$

That is, oxygen discharged into the atmosphere and oxygen in the exhaust gas are activated by the catalyst (noble metal) to react with soot (carbon) to produce $CO_2$ ($CeO_{2-x}$ is oxidized to return to $CeO_2$). And also, $CeO_2$ and soot directly contact with each other, so that even if a quantity of oxygen discharged is small, the soot can efficiently be oxidized.

In this case, $CeO_2$ holds the catalyst (noble metal) to increase OSC (oxygen storing capacity). Because, the catalyst (noble metal) activates oxygen in the exhaust gas and also activates oxygen on the surface of $CeO_2$ in the vicinity of the noble metal to increase the above OSC.

Figure 13A:
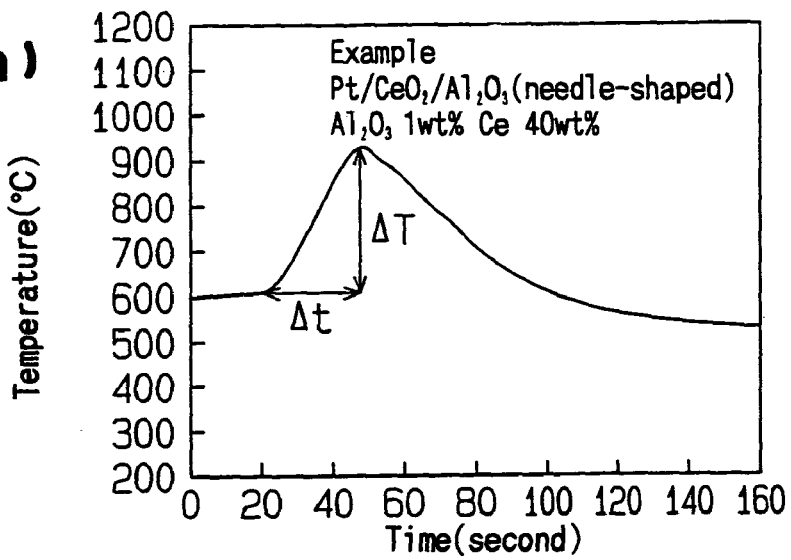
FIGS. 13(a), 13(b) and 13(c) are comparative graphs of oxidation property of soot affecting regeneration property of DPF.
Figure 13B:
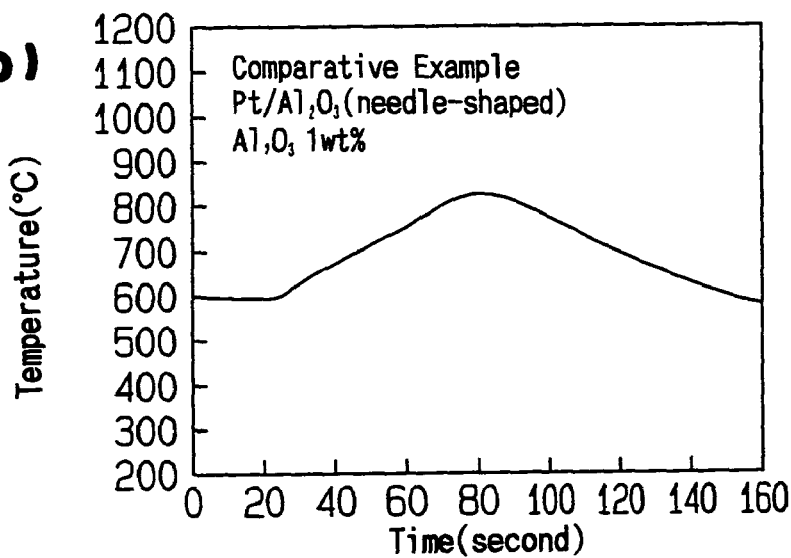
Figure 13C:
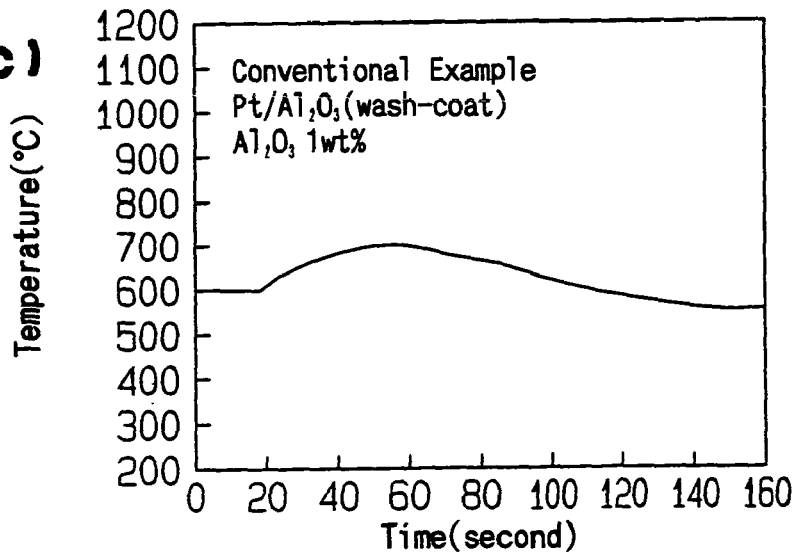
Figure 14:
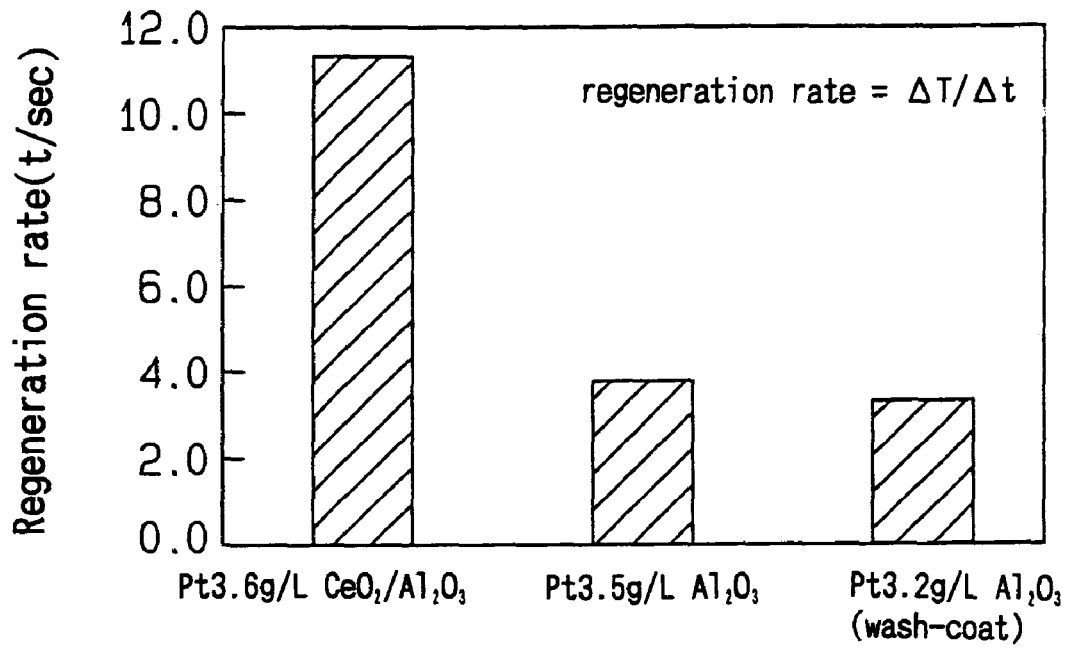
FIG. 14 is a comparative graph regeneration (combustion) rate affecting regeneration property of DPF.

FIG. 13 and FIG. 14 show experimental results on regeneration properties of a catalyst holding filter 10 (invention embodiment) comprising Pt as a catalyst, $CeO_2$ as a cocatalyst and needle-shaped $Al_2O_3$ as a support material and a catalyst holding filters 10 of Pt/needle-shaped $Al_2O_3$ (comparative example) and Pt/$Al_2O_3$ (wash coat) for the effect of adding a rare earth oxide such as ceria or the like to the alumina thin film 3. In this experiment, diesel particulate filter adhered with soot (DPF fill length: 150 mm) is placed in an electric furnace and heated to 650° C., while a diesel engine of 1100 rpm and 3.9 Nm is connected thereto, during which a change of a filter temperature (measured at a position of 145 mm from an inlet port) (FIG. 13) when an exhaust gas (350° C.) and regeneration (combustion) rate (ratio of temperature rising ΔT to lapse time Δt, FIG. 14) are measured.

As shown in FIG. 13, the conventional example (catalyst coat layer 2 formed by wash coat) produces a peak temperature at 50 sec-700° C. as $O_2$ becomes rate-determining, while the comparative example (no ceria (cocatalyst)) produces a peak temperature at 80 sec-800° C. as $O_2$ becomes rate-determining. In the invention example, a high peak temperature produces at a faster rate of 45 sec-900° C., which shows a higher oxidation removal efficiency of soot and a higher regeneration ratio. This also clearly appears as a difference of regeneration (combustion) rate in FIG. 14.

Figure 15:
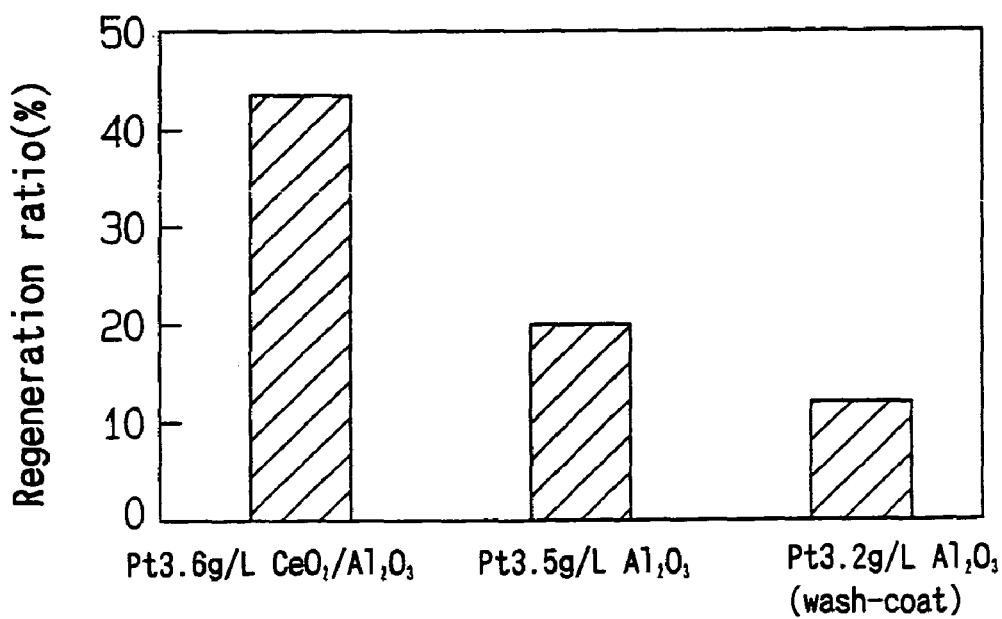
FIG. 15 is a comparative graph of a regeneration ratio of DPF.

Furthermore, FIG. 15 shows a comparison of the regeneration ratio, from which it is clear that the effect of the invention example (ceria-containing catalyst) is remarkable. DPF filters the soot in the exhaust gas. Therefore, the soot deposits in the inside of the DPF. The action of removing the deposited soot is called as regeneration. Therefore, a ratio of regenerated soot weight to deposited soot weight is represented by a percentage, which is defined as a regeneration ratio.

Moreover, as the rare earth oxide, it is more favorable to use a composite oxide of, for example, a rare earth element and zirconium in addition to the above single oxide ($CeO_2$). It is considered that the property of controlling the oxygen concentration can be improved by including zirconium oxide in the rare earth oxide through the control of the grain growth by the rare earth oxide.

The rare earth oxide forming the composite oxide with zirconium is favorable to have a particle size of about 1-30 nm, more preferably 2-20 nm. When the particle size is less than 1 nm, it is difficult to form the composite oxide, while when the particle size exceeds 30 nm, the particles are apt to be sintered and the surface area of the particle becomes small and hence the contact area with the exhaust gas becomes small and a problem of weakening the activity remains. Further, there is a fear of increasing the pressure loss in the passing of the exhaust gas.

(Structure of Alumina Thin Film 3)

Figure 5A:
FIGS. 5(a) and 5(b) are photographs showing a structure of SiC particle in the catalyst support.
Figure 5B:
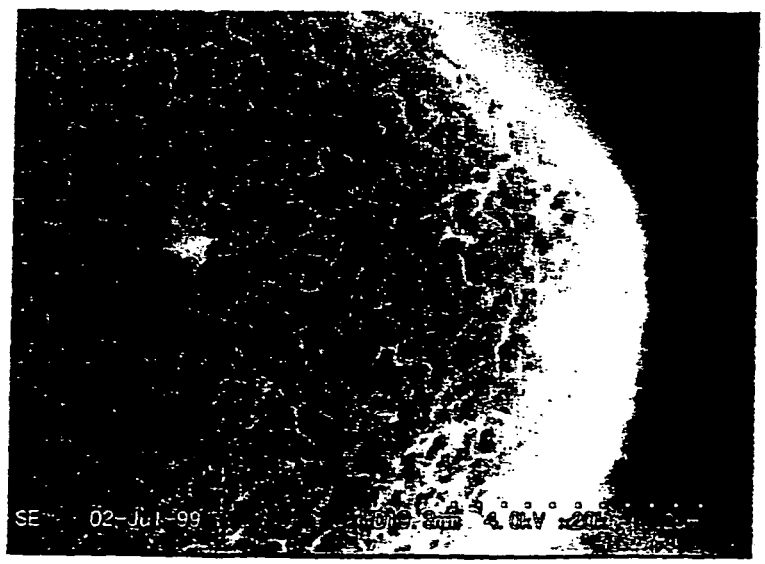

FIG. 5 shows a comparison between an electron microphotograph (×20000) of the ceramic support 15 in which each surface of SiC particles 4 is covered with the alumina thin film 3 and an electron microphotograph (×5000) of the support in which the surface of the cell wall 12 is uniformly covered with alumina film (conventional technique). It is apparently seen that needle-shaped (small fibrous) alumina is forested on the surface of each SiC particle 4, which indicates a haired structure as shown in FIG. 3(b).

Such a structure of the alumina thin film 3, i.e. crystal structure of alumina thin film 3 formed by covering each surface of SiC particles 4 contains at least one of $\gamma$-$Al_2O_3$, δ-$Al_2O_3$ and θ-$Al_2O_3$. The small fiber protruded alumina constituting the alumina thin film 3 has a diameter of 2-50 nm, a length of 20-300 nm and a ratio of full length/diameter of 5-50. And also, the alumina thin film 3 having such a structure is favorable to have a thickness of not more than 0.5 μm and a specific surface area of alumina of 50-300 $m^2/g$ based on alumina.

The above-mentioned thickness of the alumina thin film 3 is the average distance between each surface of SiC particles 4 and each edge of the small fiber protruded alumina. Furthermore, the diameter of the alumina is more desirable to be 5-20 nm and the ratio of the full length/diameter is more desirable to be 10-30.

The reason why the properties of the small fiber protruded alumina thin film 3 are restricted as mentioned above is due to the fact that when the length of the small fiber protruded alumina is less than 20 nm, it is difficult to ensure the required specific surface area, while when it exceeds 300 nm, the structure becomes brittle. And also, when the diameter is less than 2 nm, it is equal to or smaller than the size of the catalyst such as noble metal or the like and does not serve as a catalyst holding layer, while when it exceeds 50 nm, it is difficult to ensure the desirable specific surface area. Furthermore, when the ratio of full length/diameter is less than 5, it is difficult to ensure the required specific surface area, while when it exceeds 50, the structure becomes brittle and there may be caused the breaking of the small fiber protrusion by the washing operation or the like.

Further, the reason why the specific surface area of the alumina thin film 3 is restricted as mentioned above is due to the fact that when it is less than 50 $m^2/g$, the sintering of the small fiber protruded alumina excessively progresses and the durability becomes poor. On the other hand, when the specific surface area exceeds 300 $m^2/g$, the small fiber protruded alumina is too finer and does not serve as so-called catalyst holding layer or becomes structurally brittle. Moreover, a preferable specific surface area is a range of 50-200 $m^2/g$.

Then, an amount of alumina thin film 3 as a holding film in the ceramic support 15 is favorable to be 0.1-15 mass % at an alumina ratio. When it is less than 0.1 mass %, the effect of improving the heat resistance becomes small, while when it exceeds 15 mass %, the pressure loss increases and the filter function lowers. More preferably, it is 1-4 mass %.

In the ceramic support 15, when the support is, for example, porous silicon carbide (SiC), the silicon content is favorable to be 0.01-10 mass %. When the silicon content is less than 0.01 mass %, a capacity of supplying Si is lacking and the effect of improving the heat resistance is small, while when the silicon content exceeds 10 mass %, the strength of the honeycomb filter lowers. This silicon content is applied to the other silicon-containing ceramic, which is preferably 0.01-10 mass %, more preferably 0.01-5 mass %, particularly 0.01-2 mass %.

Since each surface of the SiC particles 4 is individually covered with the alumina thin film 3, the surface of the ceramic support 15 indicates a state of completely covering with the alumina thin film (holding film) 3. On the such a ceramic support 15 is held a noble metal element as a catalyst and an element selected from Group VIa and Group VIII in the Periodic Table. Concretely, these elements include platinum (Pt), palladium (Pd), rhodium (Rh), nickel (Ni), cobalt (Co), molybdenum (Mo), tungsten (W), cerium (Ce), copper (Cu), vanadium (V), iron (Fe), gold (Au), silver (Ag) and so on.

Therefore, at least one element selected from Pt, Au, Ag, Cu as a noble metal, Mo, W as an element of Group VIa in the Periodic Table, Fe, Co, Pd, Rh, Ni as an element of Group VIII in the Periodic Table and V, Ce as an element other than the above in the Periodic Table or a compound thereof is held as a catalyst on the alumina thin film 3.

For example, binary alloy or ternary alloy based on a combination of the above elements is used as the compound. These alloys are advantageous to be used together with the rare earth oxide such as ceria or lanthana acting as a cocatalyst as previously mentioned. Such a catalyst holding filter 10 is less in the deterioration by poison (lead poison, phosphorus poison, sulfur poison) and small in the heat degradation and hence it is excellent in the durability. Moreover, a compound based on a combination with the other element (oxide, nitride or carbide) may be used in addition to the above alloy based on the combination of the elements.

Incidentally, as the binary alloy, there are Pt/Pd, Pt/Rh, Pt/Ni, Pt/Co, Pt/Mo, Pt/W, Pt/Ce, Pt/Cu, Pt/V, Pt/Fe, Pt/Au, Pt/Ag, Pd/Rh, Pd/Ni, Pd/Co, Pd/Mo, Pd/W, Pd/Ce, Pd/Cu, Pd/V, Pd/Fe, Pd/Au, Pd/Ag, Rh/Ni, Rh/Co, Rh/Mo, Rh/W, Rh/Ce, Rh/Cu, Rh/V, Rh/Fe, Rh/Au, Rh/Ag, Ni/Co, Ni/Mo, Ni/W, Ni/Ce, Ni/Cu, Ni/V, Ni/Fe, Ni/Au, Ni/Ag, Co/Mo, Co/W, Co/Ce, Co/Cu, Co/V, Co/Fe, Co/Au, Co/Ag, Mo/W, Mo/Ce, Mo/Cu, Mo/V, Mo/Fe, Mo/Au, Mo/Ag, W/Ce, W/Cu, W/V, W/Fe, W/Au, W/Ag, Ce/Cu, Ce/V, Ce/Fe, Ce/Au, Ce/Ag, Cu/V, Cu/Fe, Cu/Au, Cu/Ag, V/Fe, V/Au, V/Ag, Fe/Au, Fe/Ag and Au/Ag.

As the ternary alloy, there are Pt/Pd/Rh, Pt/Pd/Ni, Pt/Pd/Co, Pt/Pd/Mo, Pt/Pd/W, Pt/Pd/Ce, Pt/Pd/Cu, Pt/Pd/V, Pt/Pd/Fe, Pt/Pd/Au, Pt/Pd/Ag, Pt/Rh/Ni, Pt/Rh/Co, Pt/Rh/Mo, Pt/Rh/W, Pt/Rh/Ce, Pt/Rh/Cu, Pt/Rh/V, Pt/Rh/Fe, Pt/Rh/Au, Pt/Rh/Ag, Pt/Ni/Co, Pt/Ni/Mo, Pt/Ni/W, Pt/Ni/Ce, Pt/Ni/Cu, Pt/Ni/V, Pt/Ni/Fe, Pt/Ni/Au, Pt/Ni/Ag, Pt/Co/Mo, Pt/Co/W, Pt/Co/Ce, Pt/Co/Cu, Pt/Co/V, Pt/Co/Fe, Pt/Co/Au, Pt/Co/Ag, Pt/Mo/W, Pt/Mo/Ce, Pt/Mo/Cu, Pt/Mo/V, Pt/Mo/Fe, Pt/Mo/Au, Pt/Mo/Ag, Pt/W/Ce, Pt/W/Cu, Pt/W/Cu, Pt/W/V, Pt/W/Au, Pt/W/Ag, Pt/Ce/Cu, Pt/Ce/V, Pt/Ce/Fe, Pt/Ce/Au, Pt/Ce/Ag, Pt/Cu/V, Pt/Cu/Fe, Pt/Cu/Au, Pt/Cu/Ag, Pt/V/Fe, Pt/V/Au, Pt/V/Ag, Pt/Fe/Au, Pt/Fe/Ag, Pt/Au/Ag.

In order to hold these catalysts on the alumina thin film 3, there are considered various methods. As a method advantageously suitable for the invention, impregnation method, evaporation drying method, equilibrium adsorption method, incipient wetness method, spray method are applicable. Among them, the incipient wetness method is advantageous. This method is a method wherein an aqueous solution containing a given amount of a catalyst is added dropwise to the ceramic support 15 and at a time of slightly and uniformly wetting the surface of the support (incipient) the impregnation of the catalyst into the pores of the ceramic support 15 is stopped and thereafter the drying and firing are carried out. That is, it is carried out by adding the catalyst-containing solution dropwise to the surface of the ceramic support 15 with a billet or an injection. A holding amount of the catalyst is determined by adjusting the concentration in the solution.

The manufacturing method of the catalyst holding filter 10 is described below.

A characteristic of the manufacturing method of the catalyst filter 10 according to the invention lies in that the alumina thin film 3 containing the rare earth oxide is formed on the irregular surface of the silicon-containing ceramic support 15 by a sol-gel method. Particularly, the rare earth oxide-containing alumina thin film 3 is individually coated on each surface of SiC particles 4 forming the cell wall 12 by the immersion of the solution. After the calcination, the micro-section structure of the alumina thin film 3 is changed into an alumina thin film (holding film) 3 indicating such a haired structure that small fibers of alumina dispersed with ceria or the like are forested, and then a given amount of a catalyst is adsorbed and fixed (held) onto the surface of the alumina thin film 3.

Next, (1) formation step of ceramic support 15 and (2) holding step of catalyst are explained in detail.

(1) Coating of Alumina Thin Film 3 onto Silicon-Containing Ceramic Support 15 a. Preliminary Treatment Step

In this step, a treatment of oxidizing by heating at 800-1600° C. for 5-100 hours is carried out for supplying an amount of Si required for assisting chemical bond to alumina to each surface of SiC particles 4. Of course, this step may be omitted if a sufficient oxide film is existent on the surface of the SiC particle 4. For instance, SiC sintered body itself contains about 0.8 mass % of $SiO_2$. Further, $SiO_2$ is increased for improving the heat resistance, which is desirable to heat in an oxidizing atmosphere at 800-1600° C. for 5-100 hours. When it is lower than 800° C., the oxidation reaction hardly occurs, while when it exceeds 1600° C., the oxidation reaction excessively proceeds and the strength of the filter lowers. A recommend condition is 1000-1500° C. and 5-20 hours. Under this condition, $SiO_2$ enough to supply Si can be formed on the surface and the pressure loss property is not damaged without substantially changing the porosity and pore size of the ceramic support 15.

b. Solution Impregnation Step

In this step is carried out a treatment that a solution of a metal compound containing aluminum and a rare earth element, for example, an aqueous mixed solution f aluminum nitrate and cerium nitrate is impregnated into each surface of the SiC particles 4 constituting the cell wall 12 by a sol-gel method to coat a rare earth oxide-containing alumina thin film 3.

With respect to a solution of aluminum-containing compound in the aqueous mixed solution, an inorganic metal compound and an organic metal compound are used as a starting metal compound. As the inorganic metal compound, there are used $Al(NO_3)_3$, $AlCl_3$, $AlOCl$, $AlPO_4$, $Al_2(SO_4)_3$, $Al_2O_3$, $Al(OH)_3$, Al and so on. Among them, $Al(NO_3)_3$ and $AlCl_3$ are particularly preferable because they are easily dissolved in a solvent such as water, alcohol or the like and easy in the handling.

As the organic metal compound, there are metal alkoxides, metal acetylacetonates and metal carboxylates. Concretely, there are $Al(OCH_3)_3$, $Al(OC_2H_5)_3$, $Al(iso-OC_3H_7)_3$ and so on.

On the other hand, as the solution of cerium-containing compound in the aqueous mixed solution are used $Ce(NO_3)_3$, $CeCl_3$, $Ce_2(SO_4)_3$, $CeO_2$, $Ce(OH)_3$, $Ce_2(CO_3)_3$ and so on.

As the solvent of the mixed solution, at least one or more selected from water, alcohol, diol, polyvalent alcohol, ethylene glycol, ethylene oxide, triethanol amine, xylene and the like is used.

As the catalyst in the preparation of the solution, hydrochloric acid, sulfuric acid, nitric acid, acetic acid, hydrofluoric acid may be added. Further, in order to improve the heat resistance of the alumina thin film 3, at least one element selected from Ce, La, Pr, Nd, Ba, Ca, Li, K, Sr, Si and Zr or a compound thereof other than oxide (nitrate, chloride, sulfate, hydroxide or carbonate) may be added to the starting material in addition to the rare earth oxide.

In the embodiment of the invention, $Al(NO_3)_3$ and $Ce(NO_3)_3$ may be mentioned as a preferable example of the metal compound because they are dissolved in the solvent at a relatively low temperature and are easy in the preparation of the starting solution. And also, 1,3-butane diol is recommended as a preferable example of the solvent. A first reason of the recommendation is due to the fact that the viscosity is proper and it is possible to form a gel film of a proper thickness on the SiC particle 4 at a gel state. A second reason is due to the fact that this solvent forms a metal alkoxide in the solution and is easy to form a metal oxide polymer consisting of oxygen-metal-oxygen bond or a precursor of a metal oxide gel.

An amount of $Al(NO_3)_3$ is desirable to be 10-50 mass %. When it is less than 10 mass %, alumina amount having a surface area sufficient to maintain a catalyst activity over a long time can not be held, while when it exceeds 50 mass %, a heat generation quantity is large in the dissolution and gelation is easily caused.

An amount of $Ce(NO_3)_3$ is favorable to be 1-30 mass %. When it is less than 1 mass %, the oxidation of soot can not be promoted, while when it exceeds 30 mass %, the grain growth of $CeO_2$ after the firing occurs.

On the other hand, a compounding ratio of $Al(NO_3)_3$ to $Ce(NO_3)_3$ is favorable to be 10:2. Because, as $Al(NO_3)_3$ becomes rich, the dispersibility of $CeO_2$ particles after the firing can be improved.

A temperature in the preparation of the impregnation solution of the metal compound is desirable to be 50-130° C. When it is lower than 50° C., the solubility of a solute is low, while when it exceeds 130° C., the reaction rapidly proceeds to cause gelation and hence it can not be used as an application solution. A stirring time is desirable to 1-9 hours. When it is within the above range, the viscosity of the solution stable.

As to the above cerium-containing metal compound ($Al(NO_3)_3$ and $Ce(NO_3)_3$), $ZrO(NO_3)_3$ or $ZrO_2$ is used as a zirconium source for forming a composite oxide or solid solution of zirconium in addition to the above example. It is favorable that they are dissolved in water or ethylene glycol to from a mixed solution and then the mixed solution is impregnated, and thereafter the composite oxide is obtained through drying and firing steps.

In the invention, it is important that the above adjusted solution of the metal compounds is penetrated into all pores being spaces between SiC particles 4 in the cell wall 12. For this end, it is favorable to adopt a method wherein the ceramic support 15 is placed in a container and the solution of the metal compounds is filled therein and then deaeration is conducted, a method wherein the solution is flowed into the ceramic support 15 from one side thereof and deaerated from the other side, or the like. In this case, as a deaeration apparatus, a vacuum pump or the like in addition to an aspirator may be used. By using such an apparatus can be pulled out air from the pores in the cell wall 12 and hence the solution of the metal compounds can be uniformly applied onto each surface of the SiC particles 4.

c. Drying Step

This step is a treatment that volatile component such as $NO_2$ or the like is removed through evaporation to change the solution into gel to thereby fix onto the surfaces of the SiC particles 4 and at the same time an extra solution is removed, which is carried out by heating at 120-170° C. for about 2 hours. When the heating temperature is lower than 120° C., the volatile component hardly evaporates, while when it exceeds 170° C., the thickness of the gelated film becomes ununiform.

d. Calcining Step

This step is a treatment that calcination is carried out to remove residual components and form an amorphous alumina thin film 3. Concretely, it is desirable to heat at a temperature of 300-500° C. When the calcining temperature is lower than 300° C., the residual organic substance is hardly removed, while when it exceeds 500° C., $Al_2O_3$ is crystallized and the small fibrous protruded boehmite can not be formed by a subsequent hot water treatment.

e. Hot Water Treatment Step

This step is a treatment that the calcined ceramic support 15 is immersed in hot water for forming the alumina thin film 3 of the aforementioned structure inherent to the embodiment of the invention. Immediately after such a hot water treatment, the particles of the amorphous alumina thin film 3 are discharged into the solution at a sol state by defloculation action and boehmite particles produced by hydration aggregate into small fibrous protrusions and form a stable state against defloculation.

That is, the rare earth oxide-containing alumina individually adhered to each surface of the SiC particles 4 by this hot water treatment are forested in small fibers (needle-shaped particles) and indicate so-called haired structure to form coarse surfaces. Therefore, the alumina thin film 3 having a high specific surface area is formed. In general, the sintering of alumina mainly progresses by surface diffusion, and the specific surface area violently decreases in the phase transfer into α-alumina. However, since silica is included in the alumina particle, it is considered that this silica fills in the pore site of alumina or moves to the surface of the needle-shaped particle in the course of the heat treatment to suppress the surface diffusion or the sintering between the particles. Therefore, a viscous flowing mechanism through the sintering from a contact point between the needle-shaped particles is preferential in the initial sintering of the ceramic support 15, while silica shuts off the substance-moving path between the needle-shaped particles at the late stage to obstruct the transfer into α-alumina and hence it is considered that the sintering is not progressed to maintain a higher specific surface area.

The temperature in the hot water treatment is desirable to be 50-100° C. When it is lower than 50° C., the hydration of the amorphous alumina thin film 3 does not proceed and the small fibrous protruded boehmite is not formed, while when it exceeds 100° C., water evaporates and the step can not be maintained over a long time. The treating time is desirable to be not less than 1 hour. When it is less than 1 hour, the hydration of the amorphous alumina is insufficient.

d. Firing Step

This step is a treatment that the boehmite produced by hydration is heated to form alumina crystal. A preferable firing temperature is 500-1000° C., and a preferable firing temperature is 5-20. When the temperature is lower than 500° C., the crystallization is not promoted, while when it exceeds 1000° C., the sintering excessively proceeds and the surface area tends to be lowered.

(2) Holding of Catalyst a. Solution Adjusting Step

On the surface of the ceramic support 15 is covered the rare earth oxide-containing alumina thin film (holding film) 3 having the haired structure as shown in FIG. 3(*b*), and a catalyst such as Pt or the like is held on the irregular surface of the alumina thin film 3. In this case, the holding amount of the catalyst is determined by dropwise adding an aqueous solution containing Pt or the like to the ceramic support 15 so as to impregnate by an water absorbing amount thereof at a state of slightly wetting the surface.

For example, the water absorbing amount of the ceramic support 15 means that when a measured value of water absorbing amount of dry support is 22.46 mass % and a mass of this support is 110 g and a volume thereof is 0.163 l, the support absorbs 24.79/l of water.

As a starting substance of Pt is used, for example, a solution of dinitrodianmine platinum nitrate ($[Pt(NH_3)_2(NO_2)_2]$ $HNO_3$, Pt concentration: 4.53 mass %). In order to hold a given amount of 1.7 g/l of Pt, it is sufficient to hold 1.7 (g/l)×0.163 (l)=0.272 g of Pt on the support, so that the solution of dinitrodianamine nitrate (Pt concentration: 4.53%) is diluted with a distilled water. That is, a weight ratio X(%) of solution of dinitrodianamine (Pt concentration: 4.53 mass %)/distilled water is calculated to be X=0.272 (Pt amount g)/24.7 (water content g)/4.53 (Pt concentration mass %) and is 24.8 mass %.

b. Solution Impregnation Step

The above adjusted aqueous solution of a given amount of dinitrodianamine nitrate is added dropwise to both end faces of the ceramic support 15 at constant intervals with a pipette. For instance, the solution is added dropwise onto the one side face at constant intervals every 40-80 droplets, whereby Pt is uniformly dispersed and fixed onto the surface of the alumina thin film 3 covering the ceramic support 15.

c. Drying and Firing Steps.

The ceramic support 15 after the addition of the aqueous solution is dried at 110° C. for about 2 hours to remove water. Thereafter, the support is placed in a desiccator and left to stand for 1 hour to measure an adhesion amount by means of an electron balance or the like. Then, the firing is carried out in N2 atmosphere at about 500° C. for about 1 hour to conduct metallization of Pt.

The catalyst holding filter 10 according to the invention is used as a filter for the purification of the exhaust gas. As one application example of plain honeycomb ceramic support 15, there are an oxidation catalyst for a gasoline engine, a ternary catalyst and an oxidation catalyst for a diesel engine. As the other application, there is a diesel particulate filter alternately sealed into a checkered pattern of the honeycomb.

The diesel particulate filter (hereinafter abbreviated as DPF simply) itself has only a function of catching particulate (floated particle matter: PM), but when the catalyst is held to the filter, hydrocarbon and carbon monooxide in the exhaust gas can be oxidized.

And also, when holding NOx selective reduction type catalyst component or occlusion type catalyst component capable of reducing NOx even in an oxidizing atmosphere such as diesel exhaust gas, the reduction of NOx is possible. Moreover, the particulate caught in the DPF brings about its deposition and the increase of pressure loss of DPF, so that it is usually required to regenerate by removing through combustion treatment or the like. A temperature of starting combustion of soot (carbon) being a main component of the particulate included in the usual diesel exhaust gas is approximately 550-630° C. In this point, when the catalyst is held on the DPF, the combustion reaction pass of soot changes and the energy obstruction can be decreased. Hence, the combustion temperature can largely be lowered to 300° C. and the energy required for the regeneration can be reduced and the DPF system having a higher regeneration ratio can be constructed by a synergistic action with so-called above action of ceria.

As mentioned above, the catalyst holding filter 10 according to the invention is said to be particularly favorable for application to a diesel exhaust gas treating system, but the following functions can be expected.

A. Function as an Oxidation Catalyst for Diesel Exhaust Gas (1) Function of purifying exhaust gas . . . oxidation of THC (all hydrocarbon), CO (2) Function not obstructing operation of engine . . . pressure loss B. Function as a Diesel Particulate Filter Provided with Catalyst (1) Function of purifying exhaust gas . . . Combustion temperature of soot, oxidation of THC, CO (2) Function not obstructing operation of engine . . . pressure loss

EXAMPLES

The invention will be described in detail with reference to examples and comparative examples below.

A first example is carried out for confirming action and effect when a ceria-containing alumina thin film 3 is held on a surface of a ceramic support 15 having varied pore size and porosity.

Manufacturing methods of the examples and comparative examples are shown in Table 1 in lumps.

Moreover, the manufacture of the ceramic support is based on the following system. At first, silicon carbide powder having a relatively large average particle size (powder A) and silicon carbide powder having a relatively small average particle size (powder B) and, if necessary, silicon carbide powder having a middle average particle size (powder C) are mixed as starting materials. Then, a spherical acryl resin (density 1.1 g/cm$^3$) as a pore-forming agent for forming objective porosity and pore size is mixed with the staring silicon carbide powder at a volume ratio. Further, methylcellulose as a forming assistant is mixed with the starting silicon carbide powder at a weight ratio. Finally, a dispersion consisting of an organic solvent and water is mixed at a weight ratio shown in Table 1 based on total of all starting materials. Thereafter, the mixed starting materials are milled and shaped into a honeycomb by extrusion shaping, and then a part of cells 11 is sealed into a checkered pattern, Next, the shaped body is dried at 150° C., degreased at 500° C. and fired in an inert atmosphere at a firing temperature and firing time shown in Table 1 to obtain a ceramic support of each example and comparative example. The average pore size is measured by a mercury pressure method. An average value m2 of the pore size, a porosity and a standard deviation SD2 of pore size distribution represented by a common logarithm of the pore size are shown in Table 1.

TABLE 1

| | Powder A | | Powder B | | Powder C | | Pore-forming agent | | Forming assistant | Dispersion | Firing temperature | Firing time | Pore size | Porosity | Standard deviation |
|---|---|---|---|---|---|---|---|---|---|---|---|---|---|---|---|
| comparative example 1 | 8 μm | 70% | 0.5 μm | 30% | — | | 8 μm | 0% | 6% | 15% | 2200° C. | 4 hr | 8 μm | 35% | 0.2 |
| comparative example 2 | 10 μm | 70% | 0.5 μm | 30% | — | | 10 μm | 0% | 6% | 16% | 2200° C. | 6 hr | 10 μm | 35% | 0.2 |
| comparative example 3 | 60 μm | 70% | 1.0 μm | 30% | — | | 60 μm | 0% | 6% | 16% | 2200° C. | 8 hr | 60 μm | 35% | 0.2 |
| comparative example 4 | 100 μm | 60% | 5.0 μm | 30% | 30 μm | 10% | 100 μm | 0% | 6% | 16% | 2200° C. | 15 hr | 100 μm | 35% | 0.2 |
| comparative example 5 | 250 μm | 60% | 5.0 μm | 30% | 50 μm | 10% | 250 μm | 0% | 6% | 18% | 2200° C. | 20 hr | 250 μm | 35% | 0.2 |
| comparative example 6 | 8 μm | 70% | 0.5 μm | 30% | — | | 8 μm | 2% | 10% | 18% | 2200° C. | 4 hr | 8 μm | 40% | 0.2 |
| Example 1 | 10 μm | 70% | 0.5 μm | 30% | — | | 10 μm | 3% | 10% | 18% | 2200° C. | 6 hr | 10 μm | 40% | 0.2 |
| Example 2 | 60 μm | 70% | 1.0 μm | 30% | — | | 60 μm | 3% | 10% | 19% | 2200° C. | 8 hr | 60 μm | 40% | 0.2 |
| Example 3 | 100 μm | 60% | 5.0 μm | 30% | 30 μm | 10% | 100 μm | 3% | 10% | 20% | 2200° C. | 15 hr | 100 μm | 40% | 0.2 |
| Example 4 | 250 μm | 60% | 5.0 μm | 30% | 50 μm | 10% | 250 μm | 5% | 10% | 20% | 2200° C. | 20 hr | 250 μm | 40% | 0.2 |
| comparative example 7 | 8 μm | 70% | 0.5 μm | 30% | — | | 8 μm | 5% | 13% | 20% | 2200° C. | 4 hr | 8 μm | 50% | 0.2 |
| Example 5 | 10 μm | 70% | 0.5 μm | 30% | — | | 10 μm | 5% | 15% | 22% | 2200° C. | 6 hr | 10 μm | 50% | 0.2 |
| Example 6 | 60 μm | 70% | 1.0 μm | 30% | — | | 60 μm | 5% | 18% | 23% | 2200° C. | 8 hr | 60 μm | 50% | 0.2 |
| Example 7 | 100 μm | 60% | 5.0 μm | 30% | 30 μm | 10% | 100 μm | 10% | 18% | 23% | 2200° C. | 15 hr | 100 μm | 50% | 0.2 |
| Example 8 | 250 μm | 60% | 5.0 μm | 30% | 50 μm | 10% | 250 μm | 10% | 20% | 25% | 2200° C. | 20 hr | 250 μm | 50% | 0.2 |
| comparative example 8 | 8 μm | 70% | 0.5 μm | 30% | — | | 8 μm | 15% | 15% | 29% | 2200° C. | 4 hr | 8 μm | 70% | 0.2 |
| Example 9 | 10 μm | 70% | 0.5 μm | 30% | — | | 10 μm | 18% | 18% | 30% | 2200° C. | 6 hr | 10 μm | 70% | 0.2 |
| Example 10 | 60 μm | 70% | 1.0 μm | 30% | — | | 60 μm | 20% | 20% | 30% | 2200° C. | 8 hr | 60 μm | 70% | 0.2 |
| Example 11 | 100 μm | 50% | 5.0 μm | 35% | 30 μm | 15% | 100 μm | 20% | 20% | 31% | 2200° C. | 15 hr | 100 μm | 70% | 0.2 |
| Example 12 | 250 μm | 50% | 5.0 μm | 40% | 50 μm | 10% | 250 μm | 20% | 20% | 31% | 2200° C. | 20 hr | 250 μm | 70% | 0.2 |
| comparative example 9 | 8 μm | 70% | 0.5 μm | 30% | — | | 8 μm | 20% | 20% | 33% | 2200° C. | 4 hr | 8 μm | 80% | 0.2 |
| Example 13 | 10 μm | 70% | 0.5 μm | 30% | — | | 10 μm | 20% | 25% | 33% | 2200° C. | 6 hr | 10 μm | 80% | 0.2 |
| Example 14 | 60 μm | 70% | 1.0 μm | 30% | — | | 60 μm | 25% | 30% | 34% | 2200° C. | 8 hr | 60 μm | 80% | 0.2 |
| Example 15 | 100 μm | 60% | 5.0 μm | 30% | 30 μm | 10% | 100 μm | 25% | 30% | 35% | 2200° C. | 15 hr | 100 μm | 80% | 0.2 |
| Example 16 | 250 μm | 55% | 5.0 μm | 30% | 50 μm | 15% | 250 μm | 25% | 30% | 35% | 2200° C. | 20 hr | 250 μm | 80% | 0.2 |
| comparative example 10 | 8 μm | 70% | 0.5 μm | 30% | — | | 8 μm | 23% | 40% | 36% | 2200° C. | 4 hr | 8 μm | 85% | 0.2 |
| comparative example 11 | 10 μm | 70% | 0.5 μm | 30% | — | | 10 μm | 23% | 40% | 36% | 2200° C. | 6 hr | 10 μm | 85% | 0.2 |
| comparative example 12 | 60 μm | 60% | 1.0 μm | 30% | — | | 60 μm | 30% | 40% | 38% | 2200° C. | 8 hr | 60 μm | 85% | 0.2 |
| comparative example 13 | 100 μm | 60% | 5.0 μm | 30% | 30 μm | 10% | 100 μm | 30% | 40% | 38% | 2200° C. | 15 hr | 100 μm | 85% | 0.2 |

TABLE 1-continued

| | Powder A | | Powder B | | Powder C | | Pore-forming agent | | Forming assistant | Dispersion | Firing temperature | Firing time | Pore size | Porosity | Standard deviation |
|---|---|---|---|---|---|---|---|---|---|---|---|---|---|---|---|
| comparative example 14 | 250 μm | 60% | 5.0 μm | 30% | 50 μm | 10% | 250 μm | 30% | 40% | 40% | 2200° C. | 20 hr | 250 μm | 85% | 0.2 |
| Example 17 | 60 μm | 90% | 1.0 μm | 10% | — | | 60 μm | 0% | 13% | 21% | 2200° C. | 8 hr | 60 μm | 50% | 0.01 |
| Example 18 | 60 μm | 70% | 1.0 μm | 30% | — | | 60 μm | 10% | 20% | 22% | 2200° C. | 8 hr | 60 μm | 50% | 0.1 |
| Example 19 | 60 μm | 50% | 1.0 μm | 30% | 30 μm | 20% | 60 μm | 20% | 25% | 22% | 2200° C. | 8 hr | 60 μm | 50% | 0.4 |
| Example 20 | 60 μm | 50% | 1.0 μm | 30% | 40 μm | 20% | 60 μm | 40% | 25% | 23% | 2200° C. | 8 hr | 60 μm | 50% | 0.5 |

Then, 30 g/l of a catalyst coat layer is held on each of the ceramic supports. Thereafter, 10 g/l of soot is caught.

Figure 19A:
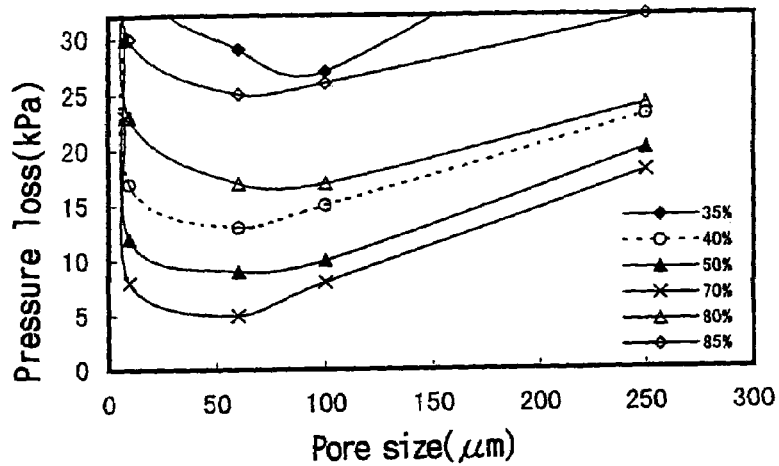
FIG. 19(a) is a graph showing results of Example between pore size porosity and pressure loss.

Further, a gas is flowed at a flow rate of 10 m/s to measure a pressure difference. The results are shown in FIG. 19(a).

From Examples 1-16 and Comparative Examples 1-14, it is understood that when 30 g/l of the catalyst coat layer is held on the ceramic support and soot is caught for 5 hours, the pressure loss becomes high at the pore size of not more than 10 μm, and as the pore size becomes large, the pressure loss gently rises from about 50 μm to 250 μm, and considerably rises at more than 250 μm.

And also, when the porosity is not more than 35%, the pressure loss becomes very high. As the porosity becomes higher, the pressure loss becomes low, and the increase again occurs about 70%, and the pressure loss becomes high. When the cut wall face is observed, the peeled and bridged catalyst coat layer is pointedly existent in the pores.

And also, the ceramic support in Examples 6, 17, 18, 19, 20 is connected to an engine and catches soot for 5 hours, and a catching efficiency is calculated from the caught amount. Next, the caught soot is washed and 30 g/l of a catalyst coat layer is held on each of the ceramic supports.

Further, it is connected to the engine in the same manner as mentioned above and catch soot for 5 hours, and a catching efficiency is calculated from the caught amount.

Figure 19B:
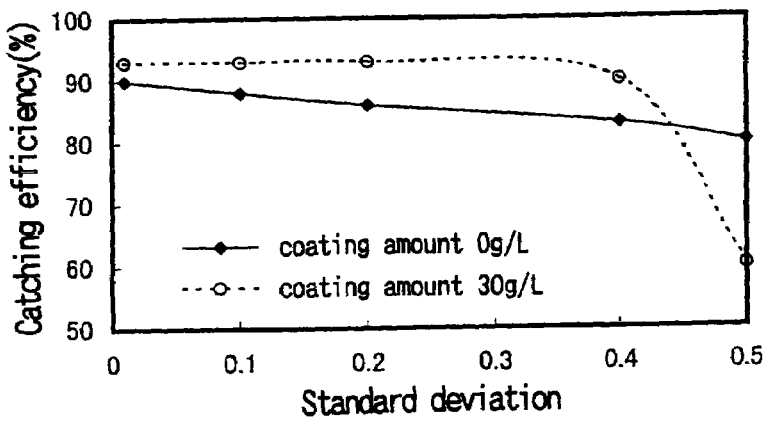
FIG. 19(b) is a graph showing between standard deviation of pore size distribution taken by a natural logarithm and catching efficiency. FIG.

The results of the above catching efficiencies are shown in FIG. 19(b).

From the results of the catching efficiency, it is understood that as the catalyst coat layer is held on the ceramic support, when the standard deviation SD2 of the pore size distribution represented by a common logarithm of the pore size is not more than 0.4, the catching efficiency is improved by coating the catalyst, while when it exceeds 0.4, the catching efficiency is degraded by coating the catalyst. And also, when the catalyst support is cut to observe the wall face, if the standard deviation is not more than 0.4, the catalyst coat layer is uniformly existent, while when the standard deviation is more than 0.4, the catalyst coat layer is largely aggregated and is pointedly existent on places of the wall.

Figure 19C:
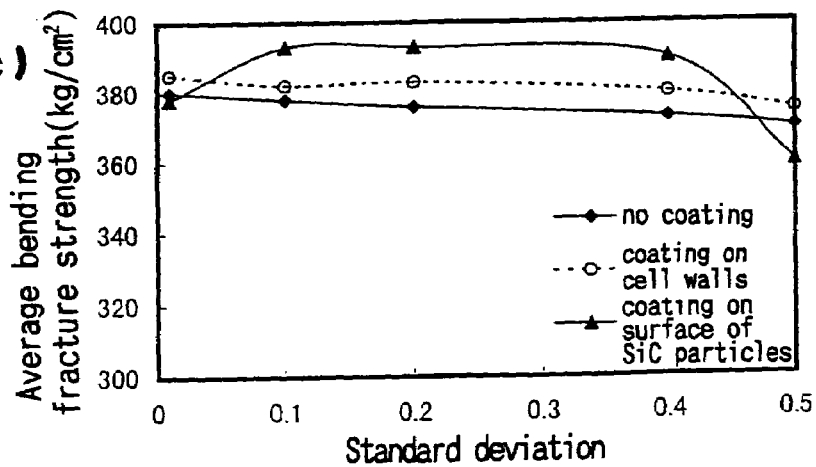

Subsequently, the ceramic support in Examples 6, 17, 18, 19, 20 is heated at 300° C. in an electric furnace and thereafter a three-point bending test is carried out every 20 supports. Then, an average of fracture loads is taken. And also, the same bending test is conducted with respect to the support held with 30 g/l of the catalyst coat layer according to the invention and the support coated on the wall as described in JP-A-5-23512. The results are shown in FIG. 19(c).

As seen from this result, there is not caused the change in the strength between the ceramic support before the coating of the catalyst and the support coated on its wall with the catalyst. However, when the catalyst is held on the sintered particle as in the invention, the strength of the sintered neck portion is increased to improve the strength. However, when adding heat of 300° C., if the standard deviation of the pore size distribution is too low, the lacking of the strength is caused due to slight cracks. If the standard deviation exceeds 0.40, the lowering of the strength becomes remarkable in a portion having a large pore size and finally the strength lowers.

As described in JP-A-5-23512, when the catalyst support is adjusted to a pore size of 15 μm and a porosity of 45% and coated on the surface and soot is caught for 5 hours, the pressure loss is not less than 30 kPa, so that the catching for a long time can not be conducted when being coated on the wall.

Test Example

A test is carried out for confirming the action and effect on the ceria-containing alumina thin film 3 formed on a surface of a ceramic support 15. A ceramic support 15 produced under conditions shown in Table 2 (Test Example 1, Comparative Test Examples 1, 2) is attached to a particulate filter (DPF) in an exhaust gas purification apparatus of a diesel vehicle to conduct a purification test. According to this test are examined pressure loss property, heat resistance and wash resistance of the filter. The examined results are shown in the same table and FIGS. 7 and 8.

TABLE 2

Figure 7:
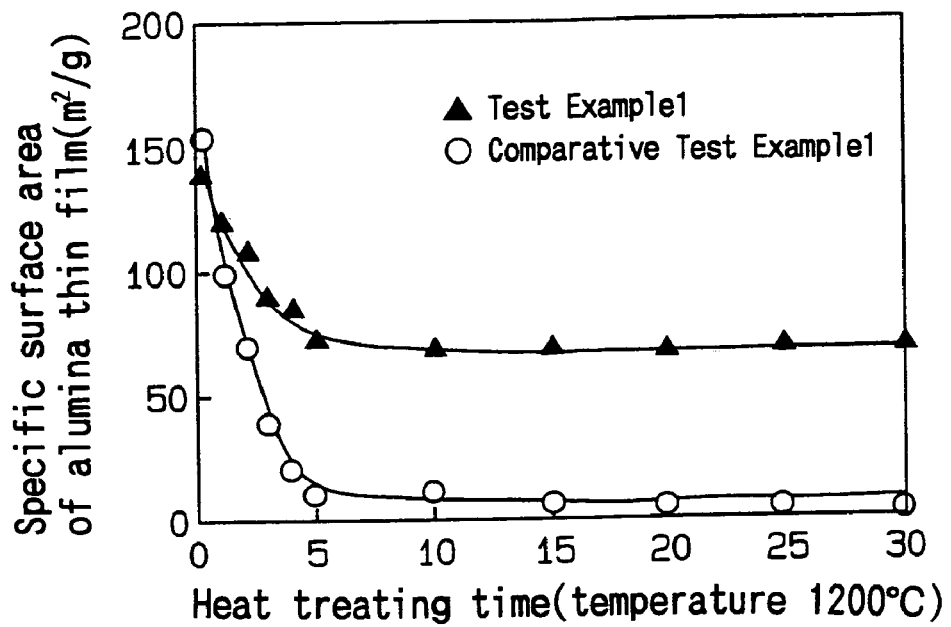
FIG. 7 is a comparative graph of a heat resistance in Test Example 1.

| | Test Example 1 | Comparative Test Example 1 | Comparative Test Example 2 |
|---|---|---|---|
| Honeycomb support | SiC filter | SiC filter | SiC filter |
| Cell structure | 14/200 | 14/200 | 14/200 |
| Catalyst coat layer | on particles | on cell wall | on cell wall |
| Porosity of ceramic support | 45% | 45% | 45% |
| Pore size of ceramic support | 20 μm | 8 μm | 20 μm |
| Alumina thin film diameter | 10 nm | — | — |
| Alumina thin film length | 150 nm | — | — |
| Alumina thin film length/diameter | 15 | — | — |
| $Ce_xO_2$ (wt %) | 30% | — | — |
| Pressure loss property (before coat) | 4.0 kPa | 7.0 kPa | 4.0 kPa |
| Pressure loss property (after coat) | 4.5 kPa | 10.0 kPa | 8.0 kPa |
| Heat resistance | | FIG. 7 | |
| Wash resistance | no peal at 70 kg/cm² | almost peal at 10 kg/cm² | almost peal at 10 kg/cm². |

(a) As shown in Table 2, before particulate (floating particulate matter: PM) is stored, Test Example 1 shows the pressure loss property substantially equal to that having no alumina thin film 3, while the pressure loss when passing the same gas after the storing becomes considerably small as compared with those of Comparative Test Examples 1 and 2.

(b) As shown in FIG. 7, Test example 1 is less in the lowering of the alumina specific surface area when being subjected to a heat treatment at the same temperature as compared with Comparative Test Example 1.

(c) As to the wash resistance, as shown in Table 1, Test Example 1 is considerably superior to Comparative Test Examples 1 and 2.

(d) FIG. 15 shows a regeneration ratio (C content removed from regeneration filter/C content adhered to filter prior regeneration). In case of the alumina thin film 3 containing ceria, about 45% of C is removed, while in case of the washcoat alumina uniform film, only 20% of C is removed.

(e) As to the standard deviation SD1 of pore size distribution, as shown in FIG. 16, the average pore size m1 of the catalyst holding filter 10 in Test Example 1 is 30 μm as measured by a mercury pressure method. And also, the standard deviation SD1 of the pore size distribution represented by a common logarithm of the pore size is 0.30 (se curve C1 in the graph of FIG. 16).

On the contrary, in the catalyst holding filter of Comparative test examples 1, 2, the average value m2 of the pore size measured by the mercury pressure method is 40 μm. And also, the standard deviation SD2 of the pore size distribution represented by a common logarithm of pore size is 0.50 (curve C2 shown in FIG. 16). Therefore, the catalyst holding filter 10 is rendered into a state of existing many pores having a size suitable for catching the particulate, whereby the particulate can surely be caught. Therefore, a filter 3 having a low pressure loss and a high catching efficiency can be realized.

Test Example 2

Figure 8:
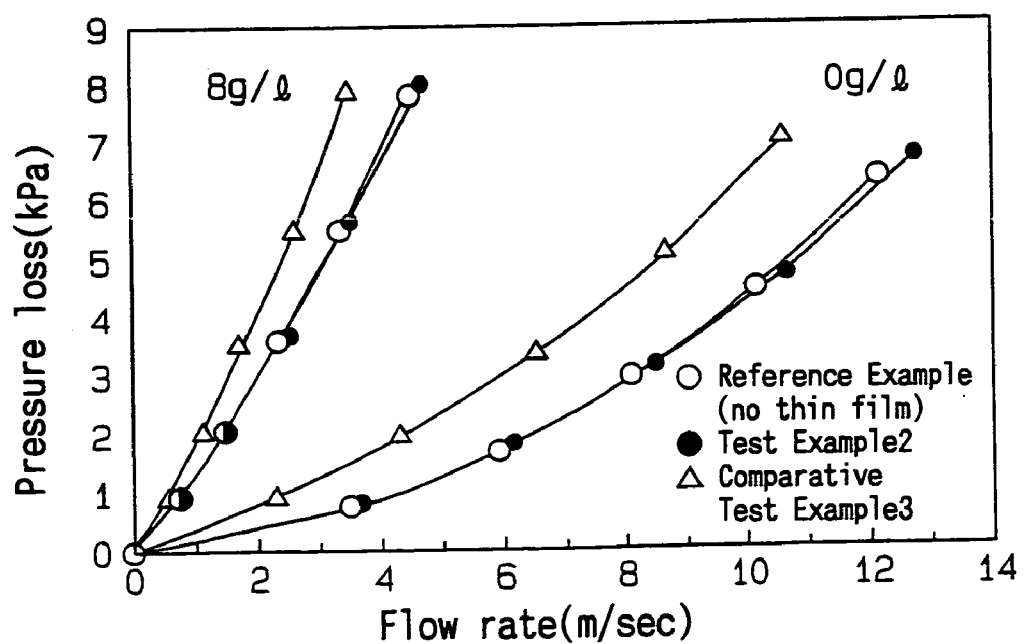
FIG. 8 is a comparative graph of a pressure loss property in Test Example 2.

This example shows test results on various properties when platinum (Pt) as a catalyst is held on a ceramic support 15 in a diesel particulate filter (DPF). The test conditions and properties are shown in Table 3. The results are shown in FIGS. 8, 9 and 10.

Moreover, this test example has an alumina thin film 3 (8 g/l) on a surface of SiC particle 4 in a ceramic support 15. Reference Test Example has not any holding film on the surface of the ceramic support 15. In Comparative Test example 3, an alumina uniform film is formed on the surface of the ceramic support 15 by wash coat.

TABLE 3

Figure 11:
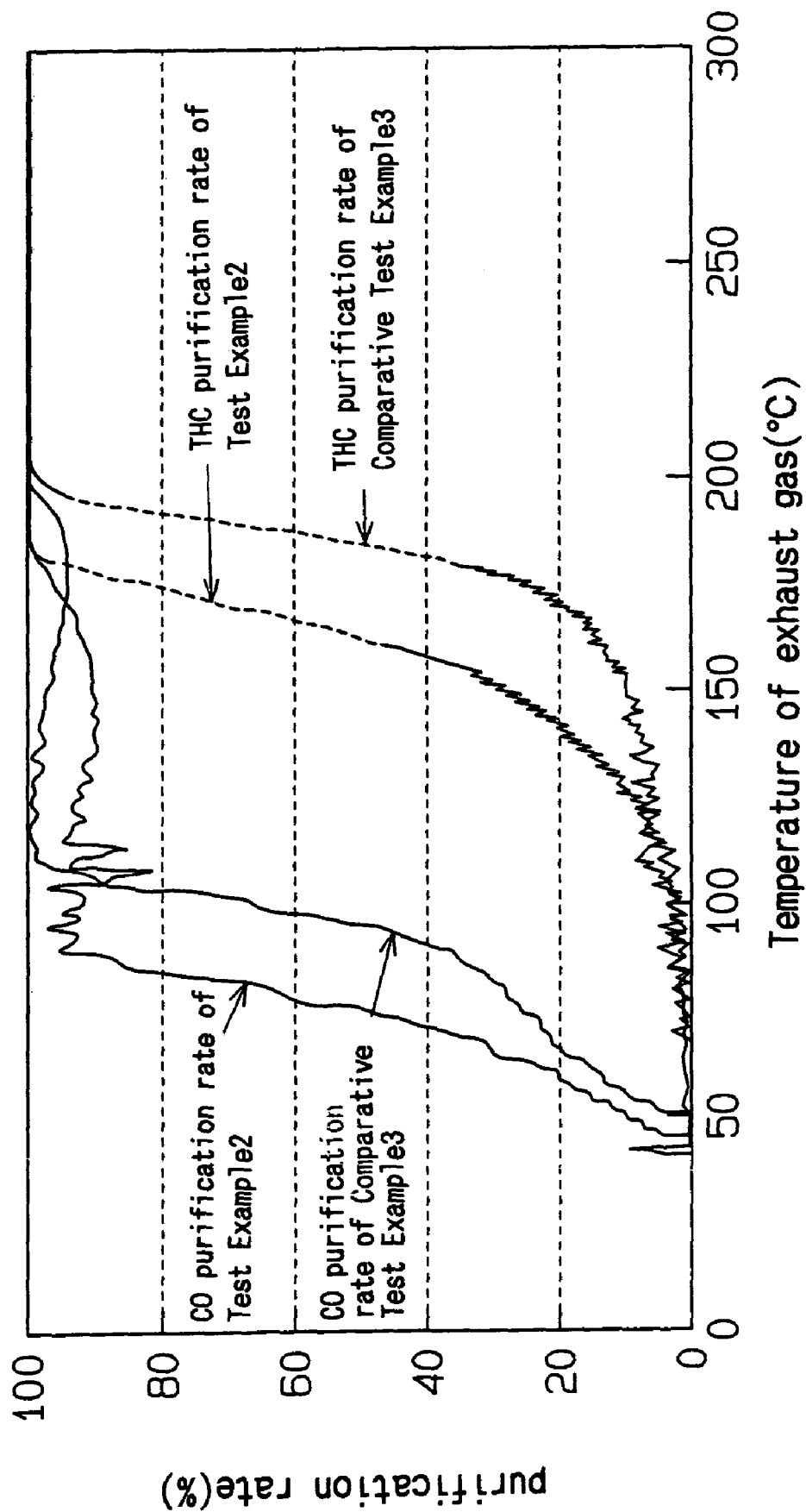
FIG. 11 is a comparative graph of THC, CO purification property in Test Example 2.

|  |  | Test Example 2 | Test Example 2 | Reference Test Example | Comparative Test Example |
|---|---|---|---|---|---|
| Honeycomb support | | SiC-DPF | SiC-DPF | SiC-DPF | SiC-DPF |
| Cell structure | | 14/200 | 14/200 | 14/200 | 14/200 |
| Catalyst coat layer | | on particles | on particles | on cell wall | on cell wall |
| Porosity of ceramic support | | 45% | 45% | 45% | 45% |
| Pore size of ceramic support | | 20 μm | 20 μm | 8 μm | 20 μm |
| $Al_2O_3$ content | | 8 g/l | 8 g/l | none | 8 g/l |
| $CeO_2$ content | | 2 g/l | 1 g/l ($CeO_2$) 1 g/l ($ZrO_2$) | none | none |
| Pt content | | 1.7 g/l | 1.7 g/l | none | 1.7 g/l |
| Pressure loss | PM0 g/l (10 m/sec) | 1 | 1 | 1 | 1.45 |
|  | PM0 g/l (10 m/sec) | 1 | 1 | 1 | 1.45 |
| Property Heat resistance of $Al_2O_3$ coat | | FIG. 9 | | | |
| Initial combustion property of soot | equilibrium temperature | 420° C. | 420° C. | >480° C. | 440° C. |
|  | equilibrium pressure | 9.2 kPa | 9.2 kPa | — | 1 kPa |
| Combustion property of soot after aging | equilibrium temperature | 420° C. | 420° C. | — | >480° C. |
|  | equilibrium pressure | 9.2 kPa | 9.2 kPa | — | — |
| THC, CO conversion rate | | FIG. 11 | | | |

(1) Pressure Loss Property

As shown in FIG. 8, when Test Examples 2, 3 are compared with Reference Test Example and Comparative Test Example 3, Test Examples 2, 3 show a pressure loss property substantially equal to that of Reference Test Example having no holding film and are considerably superior in the effect to Comparative Test Example 3.

(2) Heat Resistance

Figure 9A:
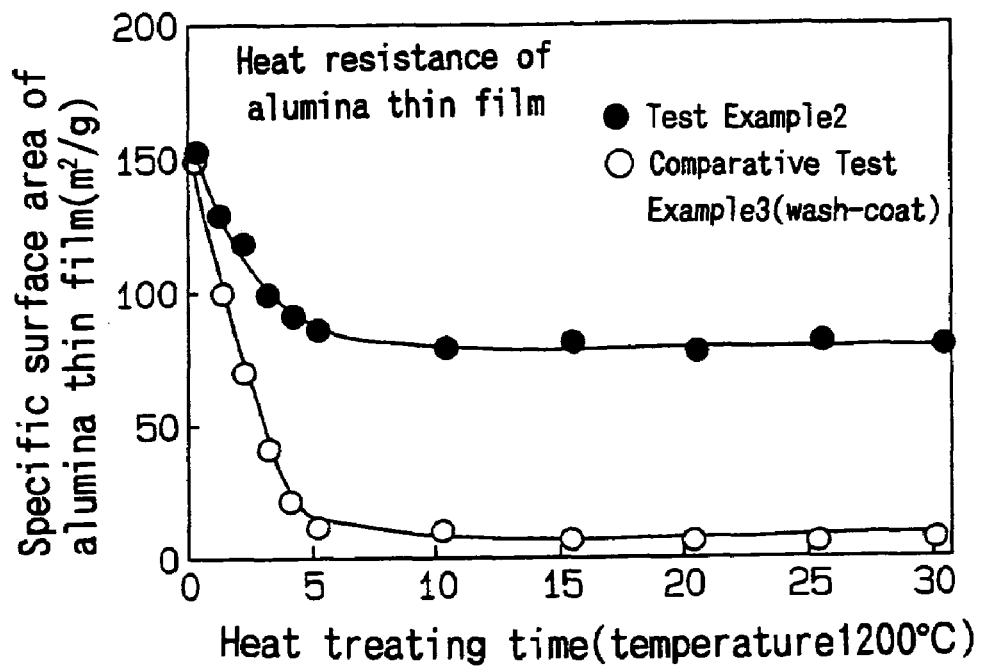
FIGS. 9(a) and 9(b) are comparative graphs of heat resistances of alumina thin film and catalyst in Test Example 2.
Figure 9B:
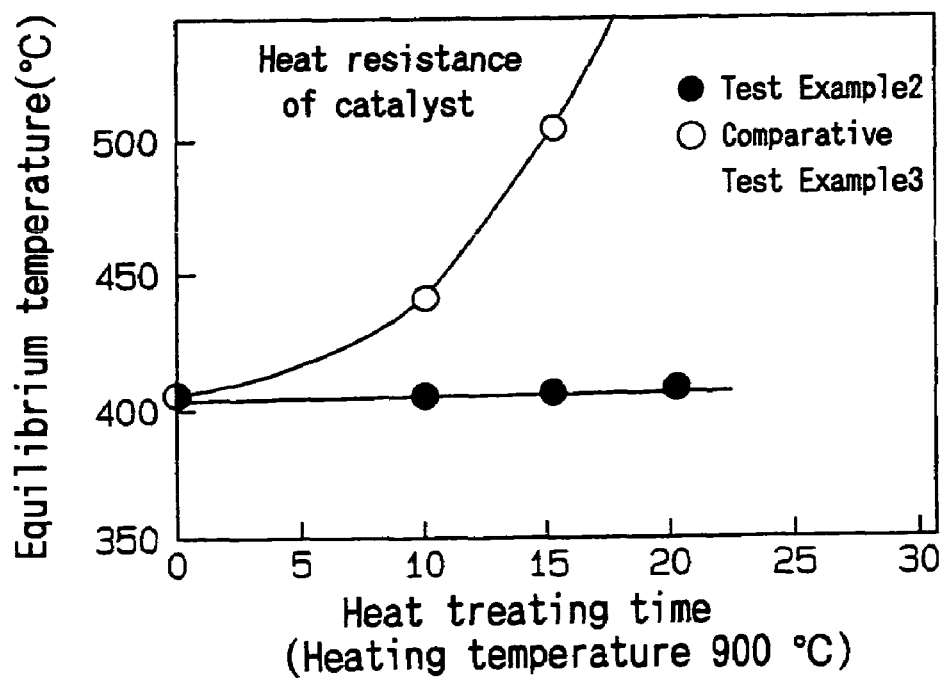
Figure 10:
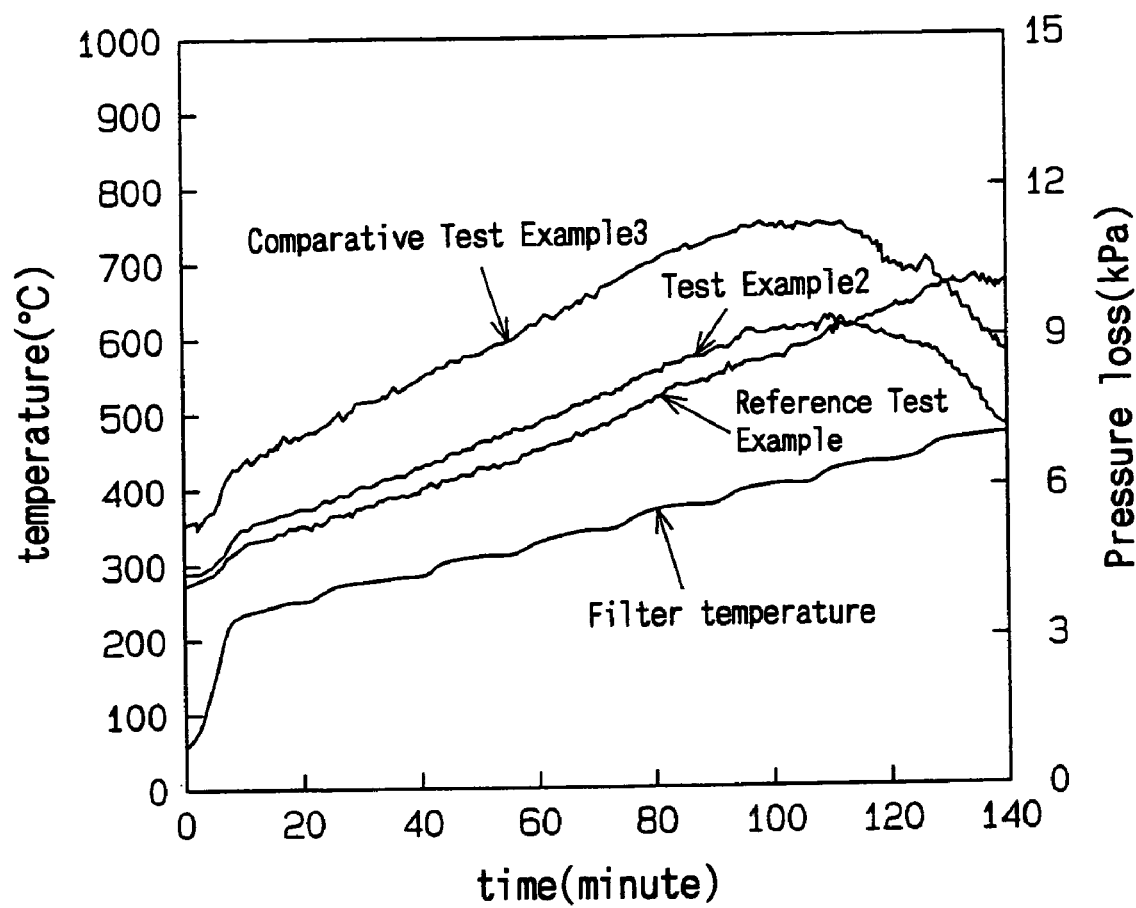
FIG. 10 is a comparative graph of combustion property of soot in Test Example 2.

As shown in FIG. 9(a) and FIG. 9(b), with respect to Test Example 2 and Comparative Test Example 3, a change of specific surface area of alumina thin film 3 heated at 1200° C. is compared with a change of equilibrium temperature heated at 900°. As seen from this comparison result, the effect of the test example is considerably developed.

(3) Combustion Property of Soot

A performance of combusting soot adhered to the catalyst holding filter 10 is evaluated by an equilibrium temperature testing method. That is, a diesel engine is placed in a testing apparatus and the catalyst holding filter (DPF) 10 is inserted on the way of the exhaust pipe, and the running is started at such a state. With the lapse of the running time, soot is caught on the DPF, so that the pressure loss increases. In this case, as the exhaust temperature is raised by any method, a point balancing a rate of depositing soot with an oxidation reaction rate of soot (equilibrium temperature) appears at a certain temperature, while a pressure at this point (equilibrium pressure) can be measured. It can be said that the lower the equilibrium temperature and equilibrium pressure, the better the catalyst holding filter 10.

As a method of raising the exhaust gas temperature in this test, an electric heater is inserted between the diesel engine and the DPF. In this method, engine revolution number and load can be made constant, so that the composition of the diesel exhaust gas does not vary during the test and the equilibrium temperature and equilibrium pressure can be ensured accurately. As the test conditions, a steady run of the diesel engine having a displacement of 273 cc is carried out at a revolution number of 1250 rpm under a load of 3 Nm, and a volume of the test filter is 0.17 liter (□ 34 mm×150 mm).

The above test results are shown in FIG. 10. In FIG. 10, an example of ceramic support 15 holding no catalyst is Reference Test example. As seen from FIG. 10, the filter temperature rises together with the rise of the exhaust gas temperature, but an equilibrium point is seen at about 500° C. When Test Example 2 is compared with Comparative Test Example 3, the equilibrium temperature is 400° C. and 410° C., respectively, and is slightly significant, but the equilibrium pressure is 11 kPa and 9.2 kPa and is improved by about 20%.

After aging is carried out in an oxidizing atmosphere of 850° C.-20 hours, when the similar test is conducted, the equilibrium temperature and pressure are not substantially changed in Test Example 2, while they are degraded to the same state of the case holding no catalyst in Comparative Test Example 3.

(4) Purification Ratio of THC, CO

This property is a general method for evaluating the oxidation catalyst, which examines a relation between purification of so-called THC (all hydrocarbon) into CO2 and water and a purifying temperature of CO into CO2. As the conversion ratio at a low temperature becomes higher, this property is said to provide an excellent catalyst system. As a measuring method, the filter is arranged in a path of an exhaust gas in an engine. The amounts of THC and CO before and after the filter are measured by an exhaust gas analyzing meter to determine a purification ratio to the temperature.

As shown in FIG. 11, Test Example 2 is superior in the performance to Comparative Test Example 3 because the purification temperatures of CO, THC decrease about 30° C. This is considered that since the catalyst is uniformly dispersed into the SiC particles 4 of the cell wall 12 in this test example, the time of passing the exhaust gas through the cell wall 12 is clearly longer than the time of passing through the wash coat and as a result, a chance of adsorbing CO, THC on an active point of Pt is increased. In other words, since the catalyst is uniformly dispersed in the SiC particles 4, the contact area of the exhaust gas with the catalyst coat layer 2 cam be made large. Therefore, the oxidation of CO and HC in the exhaust gas can be promoted.

Moreover, the embodiment of the invention can be modified as follows.

The ceramic material constituting the catalyst holding filter 10 is not necessarily a porous body as in the embodiment, nor a honeycomb structure. That is, it is possible to select a network aggregate of ceramic fibers, a ceramic foam or the like as a filter constituting material.

The ceramic material constituting the catalyst holding filter 10 is not necessarily limited to silicon carbide as in the embodiment, and is possible to select, for example, silicon nitride, cordierite, sialon or the like.

The catalyst may not be held on the surface of the porous ceramic material constituting the catalyst holding filter 10.

As mentioned above in detail, according to the invention, there is provided the catalyst holding filter being less in the pressure loss of the exhaust gas and improving the mechanical strength. And also, according to the invention, there is provided the catalyst holding filter having a higher catching efficiency of particulate included in the exhaust gas.

The invention claimed is:

1. A catalyst holding filter for purification of exhaust gas comprising encapsulated carrier particles of a ceramic support, the filter having an average pore size of 10-250 µm and a porosity of 40-80%, the encapsulated carrier particles comprising a catalyst coat layer, wherein the catalyst coat layer is present on the encapsulated carrier particles throughout a cross-section of the filter, wherein the average pore size is measured by a mercury pressure process and a standard deviation of pore size distribution when the pore size is represented by a common logarithm is not less than 0.05 and not more than 0.40.

2. The catalyst holding filter according to claim 1, wherein the catalyst comprises an element selected from noble metal element, element of Group VIa of the periodic table and element of Group VIII of the periodic table.

3. The catalyst holding filter according to claim 1, wherein the catalyst layer comprises a cocatalyst that comprises at least one element selected from cerium (Ce), lanthanum (La), barium (Ba) and calcium (Ca) or a compound thereof.

4. The catalyst holding filter according to claim 1, wherein the support material comprises at least one selected from alumina, zirconia, titania and silica.

5. The catalyst holding filter according to claim 1, wherein the ceramic support comprises silicon carbide, silicon nitride, cordierite, mullite, sialon, silica or zirconium phosphate.

6. The catalyst holding filter according to claim 1, wherein the ceramic support comprises a honeycomb structure having plural through-holes defined by cell walls.

7. The catalyst holding filter according to claim 6, wherein the ceramic support comprises a checkered pattern formed by alternately sealing both end portions with sealing bodies.

8. The catalyst holding filter according to claim 6, wherein the catalyst holding filter comprises a ceramic support having at least two end portions, both end portions of the ceramic support are sealed with sealing members in a checkered pattern, and positions to be sealed differ between one and the other end of the ceramic support.

9. The apparatus for purification of exhaust gas according to claim 7, wherein a standard deviation (SD1) of pore size distribution is not less than 0.05 and not more than 0.20.

10. The catalyst holding filter according to claim 1, wherein the average pore size is measured by a mercury pressure process and a standard deviation of pore size distribution when the pore size is represented by a common logarithm is not less than 0.05 and not more than 0.20.

11. The catalyst holding filter according to claim 1, wherein the average pore size is 10-100 µm and the porosity of the ceramic support is 50-80%.

12. The catalyst holding filter according to claim 1, wherein the catalyst comprises an element selected from cerium (Ce), copper (Cu), vanadium (V), iron (Fe), gold (Au), silver (Ag), platinum (Pt), palladium (Pd), rhodium (Rh), nickel (Ni), cobalt (Co), molybdenum (Mo) and tungsten (W).

13. The catalyst support filter of claim 1, wherein the catalyst coat layer forms a coat around the encapsulated carrier particles other than at joint portions of the encapsulated carrier particles.

14. A catalyst holding filter for purification of exhaust gas, comprising encapsulated carrier particles of a ceramic support, the filter having an average pore size of 10-250 μm and a porosity of 40-70%, the encapsulated carrier particles comprising a catalyst coat layer comprising a catalyst, a cocatalyst and a support material, wherein the catalyst coat layer is present on the encapsulated carrier particles throughout a cross-section of the filter, wherein the average pore size is measured by a mercury pressure process and a standard deviation of pore size distribution when the pore size is represented by a common logarithm is not less than 0.05 and not more than 0.40.

15. The catalyst support filter of claim 14, wherein the catalyst coat layer forms a coat around the encapsulated carrier particles other than at joint portions of the encapsulated carrier particles.

16. An apparatus for purification of exhaust gas comprising a casing arranged in an exhaust path of an internal combustion engine and a ceramic support arranged in the casing and removing particulate included on an exhaust gas, wherein the ceramic support has an average pore size of 10-250 μm and a porosity of 40-70%, and a catalyst coat layer comprising a catalyst, a cocatalyst and a support material is formed on encapsulated carrier particles of the support material, wherein the catalyst coat layer is present on the encapsulated carrier particles throughout a cross-section of the ceramic support, wherein the average pore size is measured by a mercury pressure process and a standard deviation of pore size distribution when the pore size is represented by a common logarithm is not less than 0.05 and not more than 0.40.

17. The apparatus of claim 16, wherein the catalyst coat layer forms a coat around the encapsulated carrier particles other than at joint portions of the encapsulated carrier particles.

18. A catalyst holding filter for purification of exhaust gas comprising encapsulated carrier particles of a ceramic support, the filter having an average pore size of 10-250 μm and a porosity of 40-80%, the encapsulated carrier particles comprising a catalyst coat layer less than 0.5 μm thick, wherein the average pore size is measured by a mercury pressure process and a standard deviation of pore size distribution when the pore size is represented by a common logarithm is not less than 0.05 and not more than 0.40.

19. A catalyst holding filter for purification of exhaust gas comprising encapsulated carrier particles of a ceramic support, the filter having an average pore size of 10-250 μm and a porosity of 40-80%, the particles comprising encapsulated carrier particles individually coated with a catalyst coat layer, wherein the average pore size is measured by a mercury pressure process and a standard deviation of pore size distribution when the pore size is represented by a common logarithm is not less than 0.05 and not more than 0.40.

* * * * *